(12) United States Patent
Gunji et al.

(10) Patent No.: US 11,599,993 B2
(45) Date of Patent: Mar. 7, 2023

(54) IMAGE PROCESSING APPARATUS, METHOD OF PROCESSING IMAGE, AND PROGRAM

(71) Applicant: CANON KABUSHIKI KAISHA, Tokyo (JP)

(72) Inventors: Daisuke Gunji, Tokyo (JP); Tomonobu Hiraishi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 434 days.

(21) Appl. No.: 16/828,069

(22) Filed: Mar. 24, 2020

(65) Prior Publication Data

US 2020/0311920 A1 Oct. 1, 2020

(30) Foreign Application Priority Data

Mar. 27, 2019 (JP) .............................. JP2019-060349

(51) Int. Cl.
*G06K 9/00* (2022.01)
*G06T 7/00* (2017.01)
*G06T 7/12* (2017.01)
*G06V 10/25* (2022.01)

(52) U.S. Cl.
CPC .............. *G06T 7/0012* (2013.01); *G06T 7/12* (2017.01); *G06V 10/25* (2022.01); *G06T 2207/20104* (2013.01); *G06T 2207/30088* (2013.01)

(58) Field of Classification Search
None
See application file for complete search history.

(56) References Cited

FOREIGN PATENT DOCUMENTS

| JP | 2004-185555 A | 7/2004 |
|---|---|---|
| JP | 2006-146775 A | 6/2006 |

OTHER PUBLICATIONS

Wannous et al., "Enhanced assessment of the wound-healing process by accurate multiview tissue classification", IEEE Transactions on Medical Imaging (vol. 30, Issue: 2, Feb. 2011) (Year: 2011).*

* cited by examiner

*Primary Examiner* — Soo Jin Park
(74) *Attorney, Agent, or Firm* — Canon U.S.A., Inc. IP Division

(57) ABSTRACT

At least one processor of an apparatus functions as a generation unit that identifies at least an outer edge of a specific region in a surface layer of an object and that generates outer edge candidates, and a control unit that selects an outer edge candidate based on an instruction from a user among the generated outer edge candidates.

21 Claims, 21 Drawing Sheets

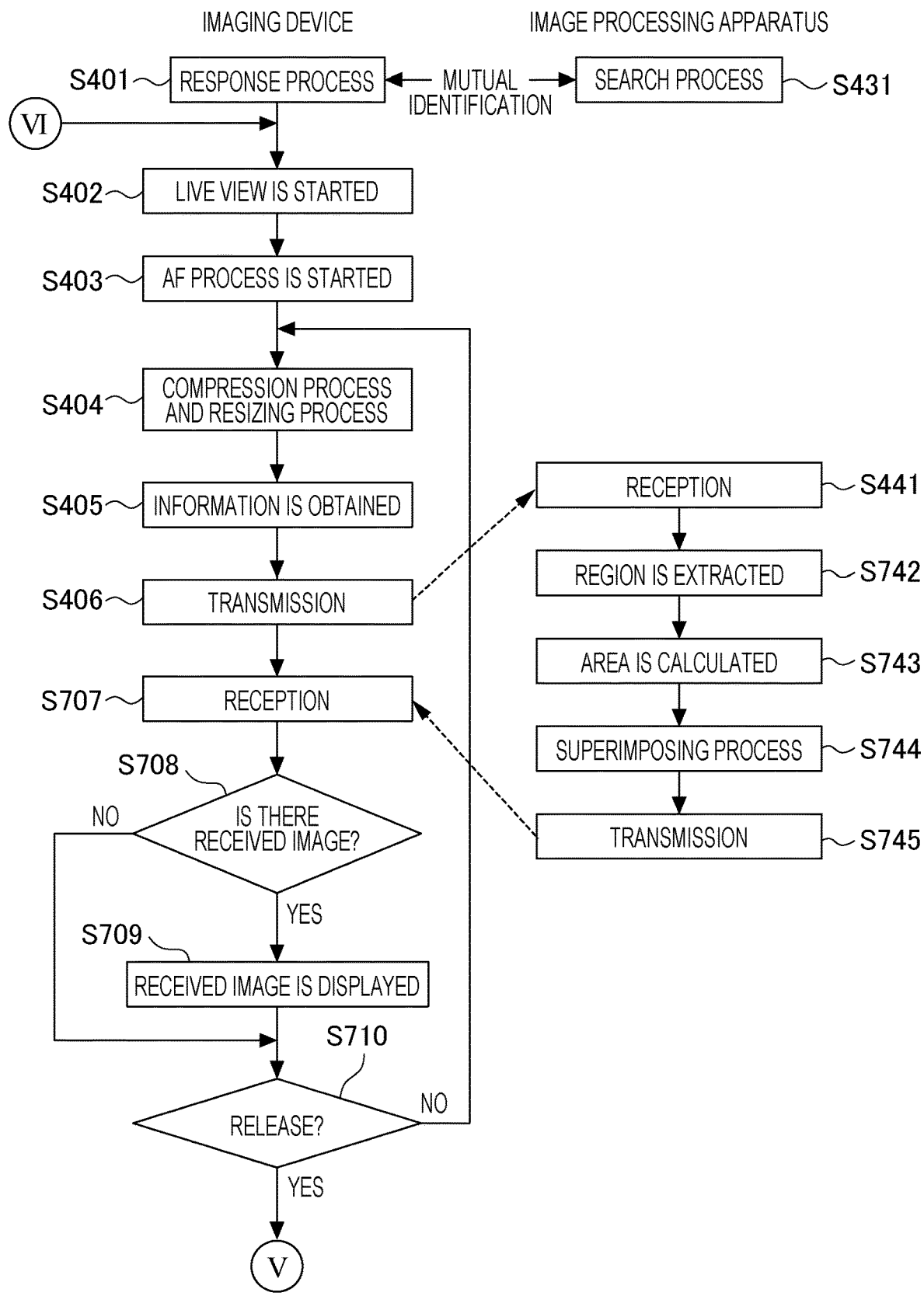

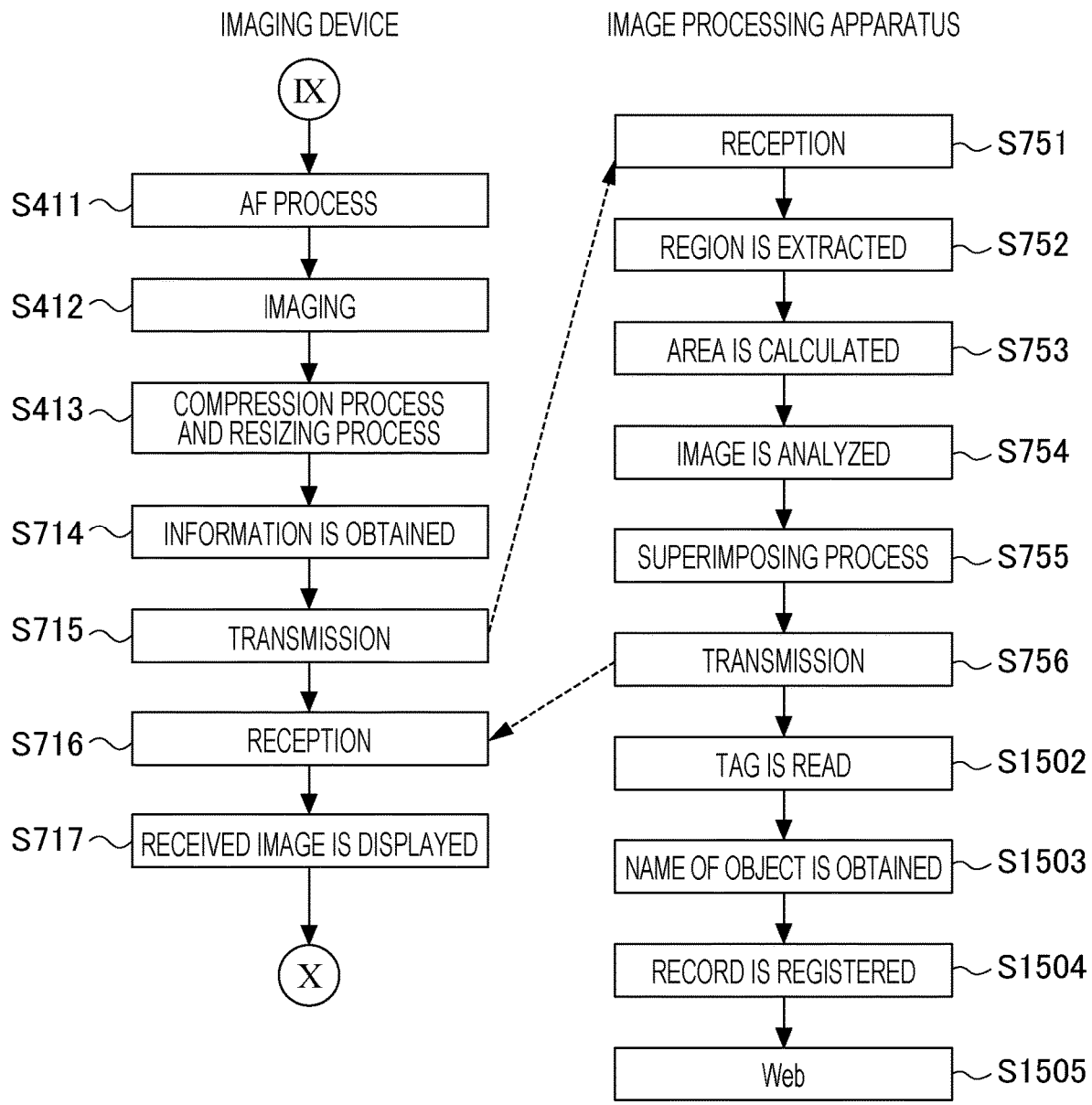

IMAGE PROCESSING APPARATUS, METHOD OF PROCESSING IMAGE, AND PROGRAM

BACKGROUND OF THE INVENTION

Field of the Invention

The aspect of the embodiments relates to a technique for processing an image that is obtained by imaging.

Description of the Related Art

A pressure ulcer (a so-called bedsore) is an example of an injury that occurs in a surface layer of a human or animal skin. One of indicators for evaluating the severity of the pressure ulcer is the size of the pressure ulcer. Nowadays, the size of the pressure ulcer is obtained on the basis of a value that is measured by manual work such as contact of, for example, a measure with a region (referred to as an affected region) in which the pressure ulcer occurs. When the size of the pressure ulcer is obtained, medical personnel measure, as a major axis length, a direct distance between two points that is presumably the maximum on the outer edge of the affected region in which the pressure ulcer occurs. A distance between two points on the outer edge in a direction perpendicular to the major axis thereof is measured as a minor axis length. However, the shape of the pressure ulcer is typically complex, thus, the medical personnel is to adjust how the measure is brought into contact therewith when the affected region of the pressure ulcer is measured. This work is to be done at least twice for measurement of the major axis length and the minor axis length. The medical personnel obtain the size of the pressure ulcer by multiplying the manually measured major axis length and minor axis length.

The medical personnel periodically work to obtain the size of the pressure ulcer as above to evaluate, for example, healing of the pressure ulcer in progress. However, the obtained size changes depending on where the major axis length and the minor axis length are measured in the affected region of the pressure ulcer. Accordingly, the medical personnel is to appropriately adjust how the measure, for example, is brought into contact with the affected region of the pressure ulcer every time to properly evaluate, for example, the healing of the pressure ulcer in progress. In the existing circumstances, the size is obtained by multiplying the major axis length and the minor axis length of the pressure ulcer. However, there is a possibility that the severity of the pressure ulcer can be more appropriately evaluated by using the area of the affected region of the pressure ulcer as the size of the pressure ulcer. Although the affected region in which the pressure ulcer occurs is taken as an example herein, the above matters are common to the cases where measurement and evaluation are carried out on affected regions such as a burn and a lacerated wound and affected regions related to other medical care, other than those of the pressure ulcer.

The medical personnel carry the great burden of the above measurement and evaluation that are carried out by manual work. Patients also carry great burden, for example, when needed to maintain the same posture during the measurement.

In view of this, it can be thought that image processing with an image that is photographed by an imaging device is performed for automatic identification and size measurement of the affected region or automatic calculation of, for example, the affected area instead of the measurement and evaluation that are carried out by manual work, and this enables the burden of the medical personnel and the patients to be reduced. Techniques that can be used to automatically identify a specific region in a surface layer of an object, such as the affected region of the pressure ulcer in the surface layer of the skin, by image processing are disclosed in Japanese Patent Laid-Open No. 2006-146775 and Japanese Patent Laid-Open No. 2004-185555. Japanese Patent Laid-Open No. 2006-146775 discloses a technique for automatically identifying the shape of the specific region in a manner in which an image is spirally scanned outward from the center, and a feature is calculated from variation in color. Japanese Patent Laid-Open No. 2004-185555 discloses a technique for providing, as candidates, images of the specific region of the face of a person, examples of which include an image of a region containing the lips, an image of a region containing the jaws, and an image of a region containing the neck, with the nose centered.

Automatic identification of the specific region, such as an injury that occurs in a surface layer of an object, by image processing can cause an issue described below. The affected region of the pressure ulcer described above is taken as an example of the specific region herein. An imaging device determines which region is regarded as the affected region during photographing. In many cases, however, the range of an image of the affected region that is needed for evaluation changes depending on the purpose of the evaluation that is carried out by the medical personnel. For example, the medical personnel evaluate only a part of the affected region at which the injury is the largest in some cases, and evaluate a large region containing a normal skin portion on the outer edge from the center of the affected region in other cases. For example, in the case where the affected region is being reduced, the medical personnel evaluate the healing of the affected region in progress in a range containing the same range as a range in which the affected region is photographed last time in some cases.

According to the technique disclosed in Japanese Patent Laid-Open No. 2006-146775, identification of the feature enables the boundary between the affected region and a region therearound to be roughly identified. However, it is difficult to strictly identify the affected region and the region therearound. Similarly, it is difficult for the technique disclosed in Japanese Patent Laid-Open No. 2004-185555 to strictly identify the affected region and the region therearound. The techniques disclosed in Japanese Patent Laid-Open No. 2006-146775 and Japanese Patent Laid-Open No. 2004-185555 cannot accurately identify where the affected region extends from the center of the affected region toward the periphery. For this reason, there is a possibility that an image of the affected region that is obtained by an identification process does not contain the entire affected region or a part thereof that the medical personnel needs. Even in the case where the image processing and the automatic identification are performed, the necessity of re-photographing, for example, imposes great burden on the medical personnel and the patients. Accordingly, cases required for re-photographing are to be avoided as much as possible. In the automatic identification of the specific region, such as an injury that occurs in a surface layer of an object, by image processing as above, the specific region be identified with high precision is sought.

SUMMARY OF THE INVENTION

The aspect of the embodiments provides an apparatus including at least one processor configured to perform operations as: a generation unit that identifies at least an outer edge of a specific region in a surface layer of an object from an image of the object and that generates outer edge candidates, and a control unit that selects an outer edge candidate based on an instruction from a user among the generated outer edge candidates.

Further features of the disclosure will become apparent from the following description of exemplary embodiments with reference to the attached drawings.

BRIEF DESCRIPTION OF THE DRAWINGS

FIG. 7A and FIG. 7B illustrate a flowchart of operation of an affected-region-photographing apparatus according to a third embodiment.

FIG. 15A and FIG. 15B illustrate a flowchart of operation of the affected-region-photographing apparatus according to the fifth embodiment.

DESCRIPTION OF THE EMBODIMENTS

Figure 1:
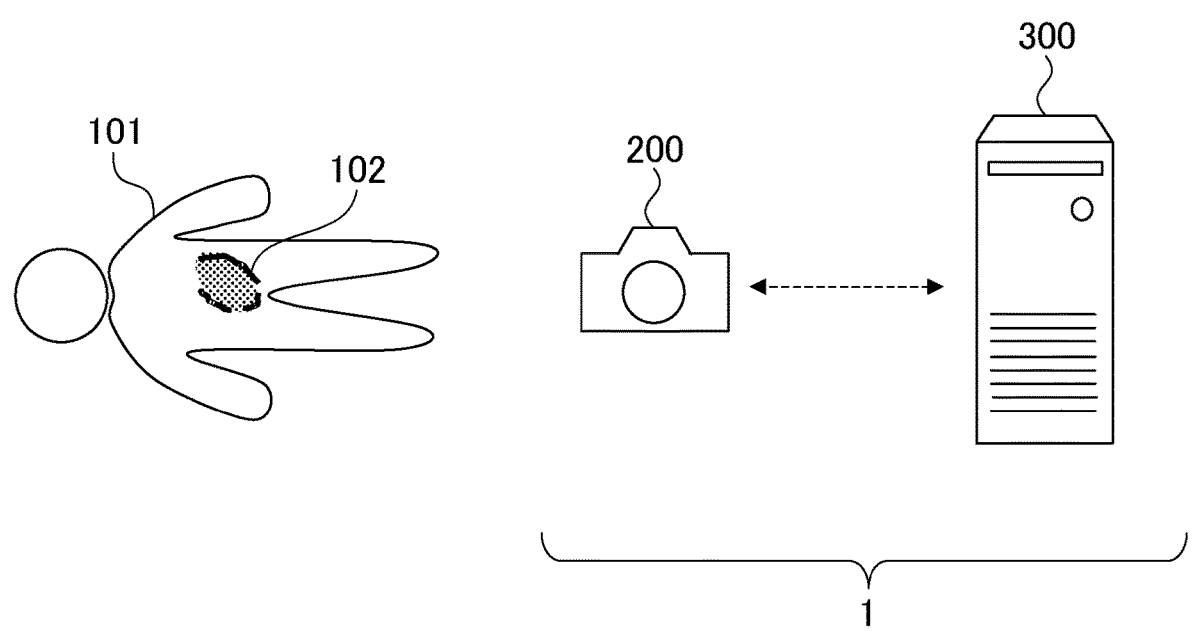
FIG. 1 schematically illustrates an affected-region-photographing apparatus.

Embodiments for carrying out the disclosure will hereinafter be described in detail by way of example with reference to the drawings. According to the embodiments of the disclosure, presumption of a region of a pressure ulcer (a so-called bedsore) that occurs in a surface layer of a human or animal skin will be described as an example of identification of a specific region such as an injury that occurs in a surface layer of an object by image processing. An example of evaluation of the pressure ulcer that occurs in the surface layer of the skin and a medical condition of the pressure ulcer will be described before a detailed description of the structure and processing of an image processing apparatus according to each embodiment.

With a human being or an animal laying down, a portion of the body in contact with a floor or a mattress below the body is pressed due to a weight. Continuation of the same posture causes circulatory failure of blood in the portion of the body in contact with the floor and necrosis of surrounding tissue. A state of the necrosis of this tissue is called the pressure ulcer or the bedsore. A patient who develops the pressure ulcer receives pressure ulcer care such as body pressure redistribution care and skin care provided by the medical personnel, and therefore, the pressure ulcer is to be periodically evaluated and managed.

A pressure ulcer state determination scale, DESIGN-R (registered trademark), developed by academic education committee of Japanese Society of Pressure Ulcers has been proposed as a tool for evaluating healing processes of injuries including the pressure ulcer.

Reference: SHORINSHA, Guidebook for pressure ulcer, the second edition, based on pressure ulcer prevention and manage guideline (the fourth edition), edited by Japanese Society of Pressure Ulcers, 23 pages.

The DESIGN-R is a tool for evaluating the healing processes of injuries including the pressure ulcer. In the DESIGN-R, observation items of a depth, an exudate, a size, inflammation and infection, granulation tissue, and necrosis tissue are evaluated. The DESIGN-R is defined by two parts, one of which is used for the purpose of severity classification for daily, simple evaluation and the other of which is used for the purpose of process evaluation to evaluate the flow of the healing process in detail. In the DESIGN-R for severity classification, six evaluation items are classified into two items of slight severity and serious severity. At a first visit, the DESIGN-R for severity classification is used for evaluation, and this enables the state of the pressure ulcer to be roughly grasped. It is known that which item is an issue, and a treatment plan is readily decided. The DESIGN-R defined for process evaluation enables comparison of the severity among patients in addition to the process evaluation. The evaluation items are weighted, and the total score (a score of 0 to 66) of the six items other than the depth represents the severity of the pressure ulcer. Consequently, a treatment process can be objectively evaluated in detail after the treatment is started. Not only personal process evaluation, but also comparison of the severity among the patients are possible.

For example, the size of the pressure ulcer (referred to below as the size) is evaluated in a manner in which a major axis length and a minor axis (axis perpendicular to a major axis) length of a skin injury region are measured, and a numeral value of the product thereof is classified into seven stages. For the DESIGN-R, it is recommended that the skin injury region be measured and graded once every week to two weeks to evaluate the healing process of the pressure ulcer and to select appropriate care. Thus, the medical condition of the pressure ulcer is to be periodically evaluated and managed. Accurate evaluation of the pressure ulcer is needed to see variation in the medical condition of the pressure ulcer. In the existing circumstances, the affected region of the pressure ulcer is measured by manual work. However, the medical personnel (referred to below as a user) carry the great burden of the above measurement and evaluation that are carried out by manual work. The patients also carry great burden.

In view of this, an image processing apparatus according to the aspect of the embodiments can accurately identify the affected region with high precision by presuming a specific region in a surface layer of an object and candidates of an outer edge from an image of the object and obtaining information for use in evaluation of the affected region, and reduces the burden of, for example, the user.

First Embodiment

FIG. 1 schematically illustrates an affected-region-photographing apparatus 1, which is an example of an image processing apparatus according to the aspect of the embodiments. The affected-region-photographing apparatus 1 according to a first embodiment includes an imaging device 200 that is a portable device that can be carried and an image processing apparatus 300 such as a personal computer. In an example in FIG. 1, the imaging device 200 and the image processing apparatus 300 are different components. However, the imaging device 200 may have the function of the image processing apparatus 300, or the image processing apparatus 300 may have the function of the imaging device 200. According to the present embodiment, a pressure ulcer that occurs on the buttocks is taken as an example of the condition of an affected region 102 of an object 101. However, this is not a limitation. The affected region 102 may be an affected region such as a burn or a lacerated wound, or an affected region related to another medical care.

The imaging device 200 of the affected-region-photographing apparatus 1 according to the present embodiment photographs the affected region 102 of the object 101, obtains an object distance, and transmits data thereof to the image processing apparatus 300. The image processing apparatus 300 identifies the affected region from a received image data, identifies a closed curve that can correspond to the outer edge of the affected region 102, and determines that the closed curve corresponds to the external shape of the affected region.

Figure 2:
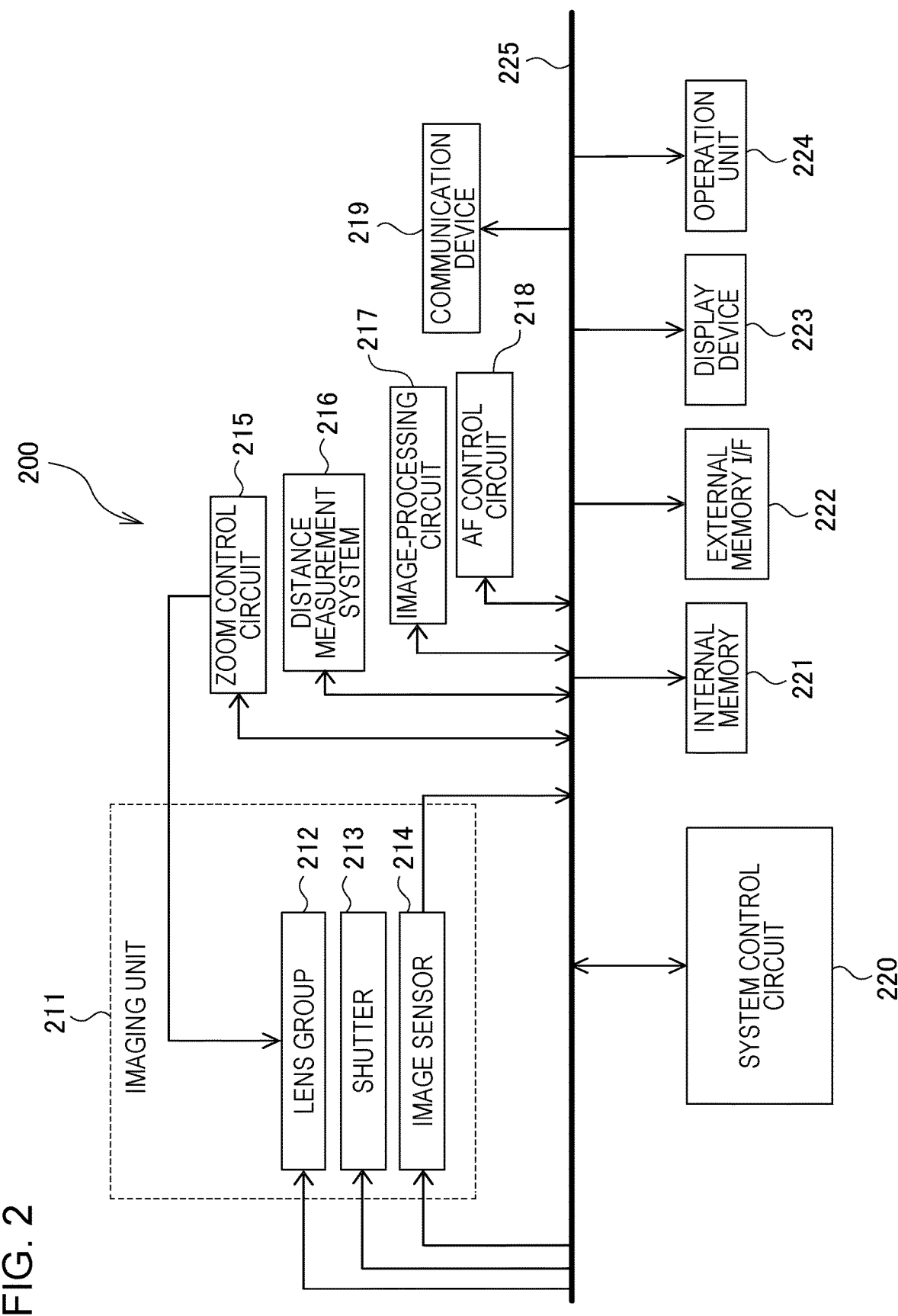
FIG. 2 illustrates an example of the structure of an imaging device.

FIG. 2 illustrates an example of the hardware structure of the imaging device 200 that is included in the affected-region-photographing apparatus 1. The imaging device 200 may be a typical single-lens digital camera, a compact digital camera, or a smartphone or a tablet including a camera having an autofocus function.

An imaging unit 211 includes a lens group 212, a shutter 213, and an image sensor 214. The lens group 212 includes a focus lens and a zoom lens and can change focus position and zoom magnification by changing the positions of the lenses. The lens group 212 also includes a stop for adjusting the amount of exposure.

The image sensor 214 includes a charge-accumulation solid-state image sensor such as a CCD or CMOS sensor that converts, for example, an optical image that is imaged by the lens group 212 into image data. Reflected light from the object passes through the lens group 212 and the shutter 213 and is focused on an imaging surface of the image sensor 214 as an object image. The image sensor 214 generates an analog electric signal based on the object image and outputs image data into which the electric signal is converted in digital form.

The shutter 213 enables the image sensor 214 to be exposed to or shielded from light by opening or closing a shutter blade to control exposure time of the image sensor 214. An electronic shutter that controls the exposure time by driving the image sensor 214 may be used instead of the shutter 213. In the case where the CMOS sensor performs the operation of the electronic shutter, reset scanning is performed to reduce the amount of accumulated charge of pixels to zero for every pixel or every region of the pixels (for example, every line). Subsequently, scanning is performed such that a signal depending on the amount of accumulated charge is read after a predetermined time for the pixel or region on which the reset scanning is performed.

A distance measurement system 216 calculates information about a distance to the object. Examples of the distance measurement system 216 may include a typical distance measurement sensor in a phase difference method with which a single-lens reflex camera is equipped and a system that uses a TOF (Time of Flight) sensor. The TOF sensor measures a distance to the object on the basis of a difference in time (or a difference in phase) between timing of transmission of an emitted wave and timing of reception of a reflected wave that corresponds to the emitted wave reflected from the object. The distance measurement system 216 may use a PSD method in which a PSD (Position Sensitive Device) is used as a light-receiving element.

In the case where the image sensor 214 is, for example, an imaging-surface phase-difference sensor, the distance measurement system 216 can obtain distance information on the basis of a signal of a difference in phase for every pixel that is outputted from the image sensor 214. The image sensor 214 in a imaging-surface phase-difference method obtains a pupil division image by using an imaging element that includes photoelectric conversion elements arranged with respect to a micro lens and that has pixels, and can detect focus by obtaining the phase difference of the pupil division image. In this case, the distance measurement system 216 obtains the distance information for every pixel or every position in the region by using the signal of the difference in phase among images that are obtained from the photoelectric conversion elements corresponding to respective pupil regions, outputted from the image sensor 214.

The distance measurement system 216 may obtain the distance information in a predetermined distance measurement area or distance measurement areas in each image or may obtain a distance map that represents distribution of the distance information of the pixels or region in the image. Other than this, the distance measurement system 216 may use TV-AF or contrast AF for determining the position of a focus lens at which the integral value of an extracted high frequency component of image data is the maximum to obtain the distance information from the position of the focus lens.

An image-processing circuit 217 performs predetermined image processing on image data that is outputted from the image sensor 214 of the imaging unit 211 or image data that is recorded in an internal memory 221. The image processing that is performed by the image-processing circuit 217 includes various kinds of image processing such as white balance adjustment, gamma correction, color interpolation, demosaicing, and filtering. The image-processing circuit 217 can perform a compression process based on a standard such as JPEG on the image data on which the image processing is performed.

An AF control circuit 218 determines the position of the focus lens that is included in the lens group 212 on the basis of the distance information that is obtained by the distance measurement system 216 and controls a motor, not illustrated, for driving the focus lens on the basis of the position to control the focus position.

A zoom control circuit 215 controls a motor, not illustrated, for driving the zoom lens that is included in the lens group 212 to control the optical magnification of the lens group 212.

A communication device 219 is a communication interface for communication of the imaging device 200 with an external device such as the image processing apparatus 300 via a wireless network (not illustrated). A specific example of the network is a network based on Wi-Fi (registered trademark) standard. Communication with Wi-Fi may be achieved through a rooter. The communication device 219 may communicate with the external device such as the image processing apparatus 300 by using a wired communication interface such as a USB or a LAN.

A system control circuit 220 includes a CPU (Central Processing Unit) that controls components of the imaging device 200 in accordance with a program that is stored in the internal memory 221. With the structure in FIG. 2, the system control circuit 220 controls, for example, the imaging unit 211, the zoom control circuit 215, the distance measurement system 216, the image-processing circuit 217, and the AF control circuit 218. The system control circuit 220 may include a FPGA or an ASIC instead of the CPU or in addition to the CPU.

The internal memory 221 is a rewritable memory such as a flash memory or a SDRAM. The internal memory 221 temporarily stores information about various settings such as information about the focus position that is used for operation of the imaging device 200 during imaging, the data of an image that is imaged by the imaging unit 211, and the image data on which the image-processing circuit 217 performs the image processing. The internal memory 221 temporarily stores analysis data such as image data and information about the size of the pressure ulcer described later, received by communication of the communication device 219 with the image processing apparatus 300.

An external memory I/F 222 is an interface with a non-volatile storage medium such as a SD card or a CF card (CF: CompactFlash is a registered trademark) that can be mounted on the imaging device 200. The external memory I/F 222 records, in the non-volatile storage medium, the image data that is processed by the image-processing circuit 217, image data or analysis data that is received by communication of the communication device 219 with the image processing apparatus 300. The external memory I/F 222 can read the image data that is stored in the non-volatile storage medium and can output the image data to the outside of the imaging device 200.

A display device 223 is a TFT (Thin Film Transistor) liquid crystal display or an organic EL display. The display device 223 may include an EVF (electronic view finder). The display device 223 displays an image based on image data that is temporarily saved in the internal memory 221 or an image based on image data that is saved in the above non-volatile storage medium, or displays a setting screen of the imaging device 200.

An operation unit 224 includes, for example, a button, a switch, a key, and a mode dial that are included in the imaging device 200 and a touch screen that is shared with the display device 223. An instruction from the user such as an instruction for mode setting or an instruction for photographing is transmitted to the system control circuit 220 via the operation unit 224.

The imaging unit 211, the zoom control circuit 215, the distance measurement system 216, the image-processing circuit 217, the AF control circuit 218, and the communication device 219 are connected to a common bus 225. The system control circuit 220, the internal memory 221, the external memory I/F 222, the display device 223, and the operation unit 224 are connected to the common bus 225. The common bus 225 corresponds to a communication line for transmitting and receiving a signal among blocks.

Figure 3:
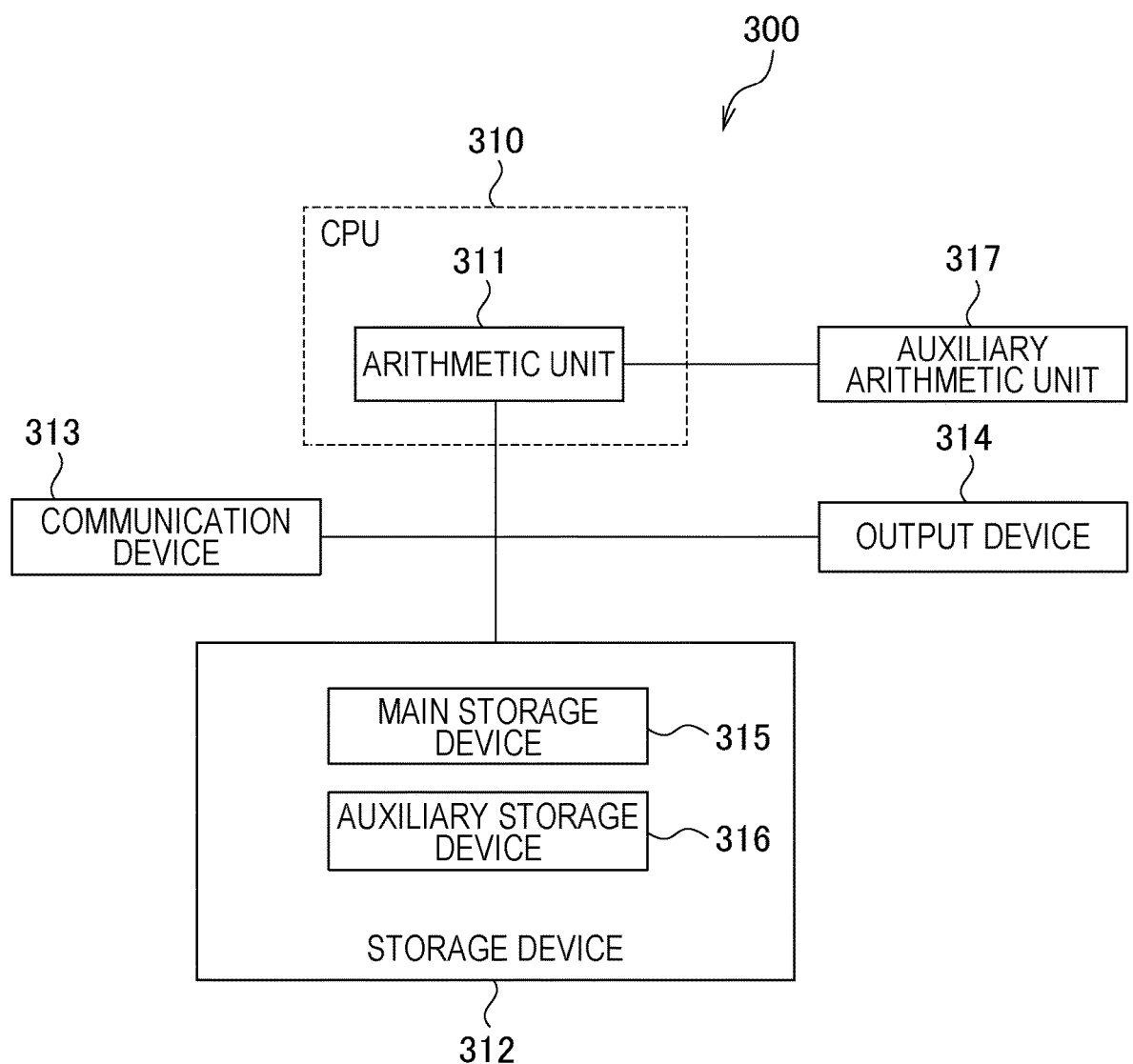
FIG. 3 illustrates an example of the structure of an image processing apparatus.

FIG. 3 illustrates an example of the hardware structure of the image processing apparatus 300 that is included in the affected-region-photographing apparatus 1. The image processing apparatus 300 includes a CPU (central processing unit) 310, a storage device 312, a communication device 313, an output device 314, and an auxiliary arithmetic unit 317. The CPU 310 includes an arithmetic unit 311. The storage device 312 includes a main storage device 315 (such as a ROM or a RAM) and an auxiliary storage device 316 (such as a magnetic disk device or a SSD (Solid State Drive)).

The communication device 313 serves as a wireless communication module.

The output device 314 outputs data that is processed by the arithmetic unit 311 or data that is stored in the storage device 312 to a display, a printer, or an external network that is connected to the image processing apparatus 300.

The auxiliary arithmetic unit 317 is an auxiliary processing IC that is used under control of the CPU 310, an example of which is a GPU (Graphic Processing Unit). The GPU, which is basically used as a processor for image processing, includes multiplier-accumulator units and is excellent in matrix calculation. Accordingly, the GPU is used as a processor for processing including signal learning in many cases. The GPU is typically used for processing including deep learning. An example of the auxiliary arithmetic unit 317 is Jetson TX2 module (Jetson is a registered trademark) made by NVIDIA Corporation. The auxiliary arithmetic unit 317 may be a FPGA (field-programmable gate array) or an ASIC (application specific integrated circuit). The auxiliary arithmetic unit 317 identifies, recognizes and extracts the affected region 102 of the object 101 from image data as described later.

The arithmetic unit 311 that is included in the CPU 310 runs a program that is stored in the storage device 312 to perform various functions including calculation of the actual size or area of the affected region 102 that is extracted by the auxiliary arithmetic unit 317 as described later. The arithmetic unit 311 also controls the order in which the functions are performed.

The image processing apparatus 300 may include the single CPU 310 and the single storage device 312 or may include the CPUs 310 and the storage devices 312. That is, the image processing apparatus 300 performs the functions described later in the case where at least one or more processing units (CPUs) and at least one storage device are connected, and the at least one more processing units run a program that is stored in at least one or more storage devices. A FPGA or an ASIC may be used instead of the CPU 310 or in addition to the CPU 310.

The following description with reference to FIG. 1 to FIG. 5 includes a series of processes according to the present embodiment, for example, in which the user such as the medical personnel photographs the affected region such as the pressure ulcer by using the imaging device 200, and information for use in evaluation of the affected region is generated from the photographed image and saved.

Figure 4A:
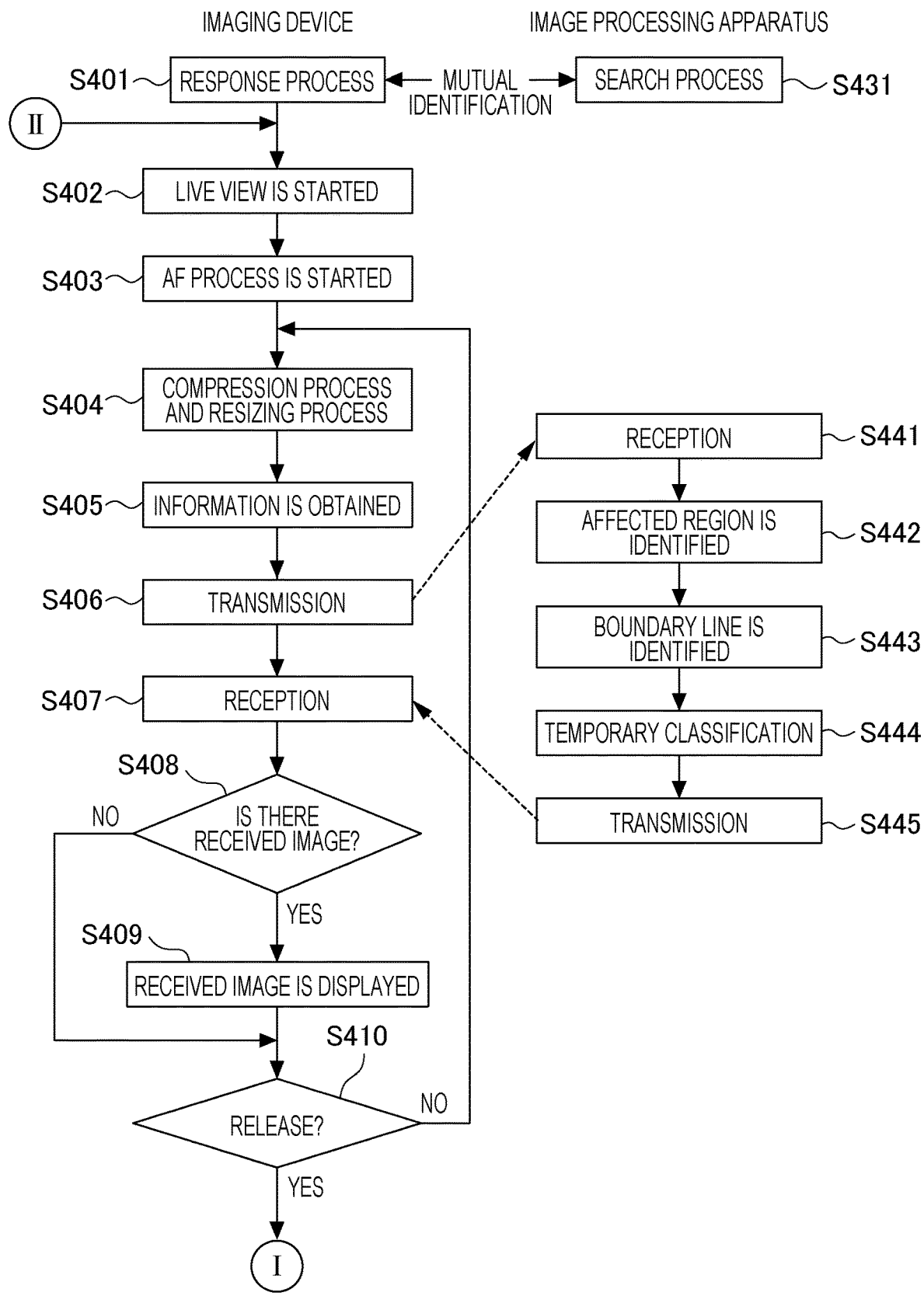
FIG. 4A and FIG. 4B illustrate a flowchart of operation of the affected-region-photographing apparatus according to a first embodiment.
Figure 4B:
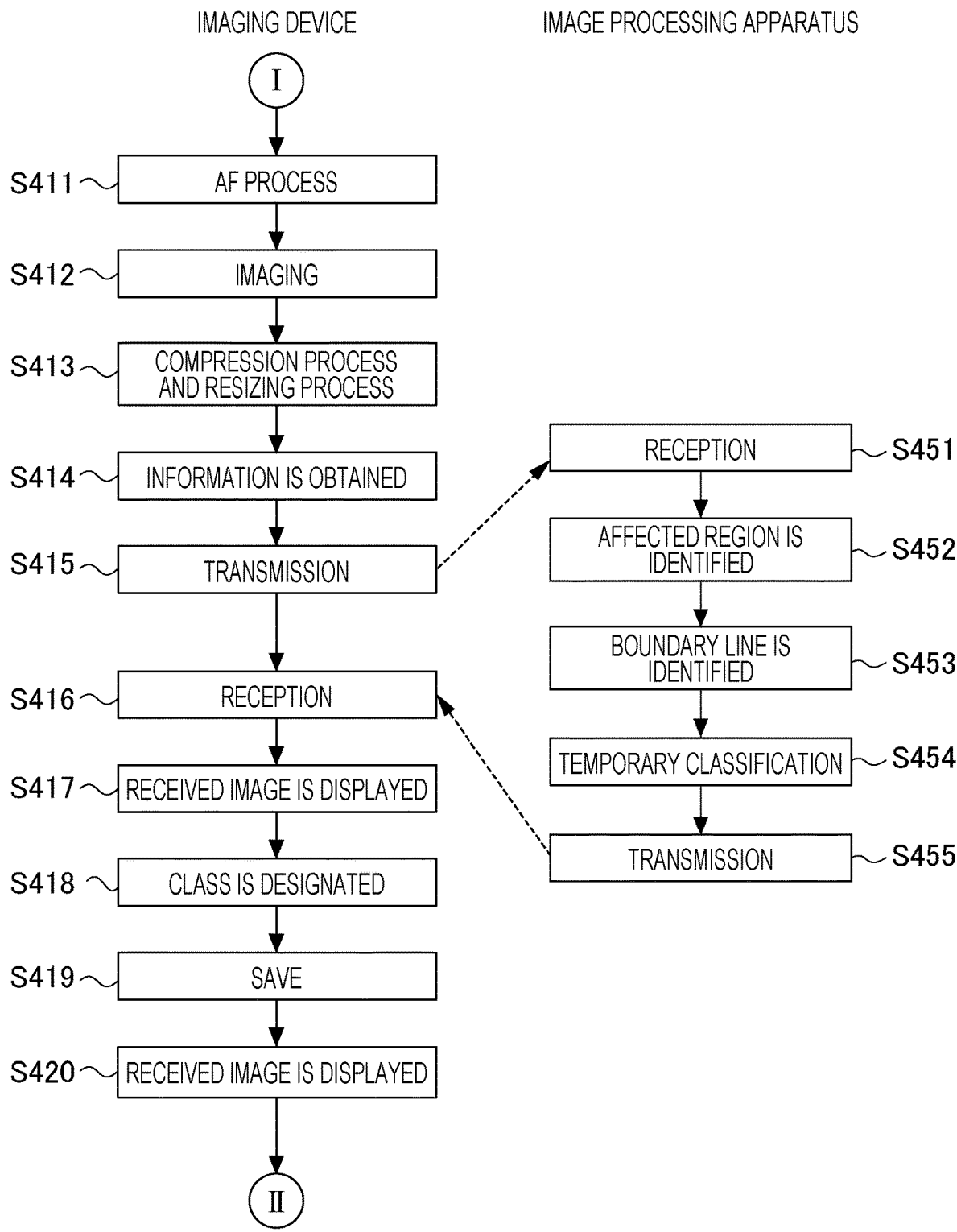

FIG. 4A and FIG. 4B illustrate a flowchart of operation of the affected-region-photographing apparatus 1 according to the first embodiment.

In FIG. 4A and FIG. 4B, processes at steps S401 to S420 on the left-hand side of the flow are performed by the imaging device 200, and processes at step S431, steps S441 to S445, and steps S451 to S455 on the right-hand side of the flow are performed by the image processing apparatus 300.

The imaging device 200 and the image processing apparatus 300 are connected to a network (not illustrated) of a Wi-Fi standard that is a wireless LAN standard. At step S431, the image processing apparatus 300 performs a search process of searching the imaging device 200 to be wirelessly connected. At step S401, the imaging device 200 performs a response process against the search process. A technique for searching the device via the network is UPnP (Universal Plug and Play). According to the UPnP, an individual device is identified by UUID (Universally Unique Identifier).

At step S402, the imaging device 200 starts a live view process when connected to the image processing apparatus 300. In the live view process, the imaging unit 211 converts an analog signal of an image that is imaged at a predetermined frame rate into a digital signal to generate image data, and the image-processing circuit 217 performs, on the image data, a development process that is used to generate live view display image data. These processes are repeatedly performed for every frame to display a live view image at the predetermined frame rate on the display device 223.

At step S403, the distance measurement system 216 obtains information about the distance from the imaging device 200 to the object 101 by any one of the distance measurement methods described above. The AF control circuit 218 starts an AF process for drive control of the lens group 212 such that the object 101 is brought into focus on the basis of the distance information. For example, in the case where the TV-AF or the contrast AF described above adjusts the focus position, the distance measurement system 216 obtains the information about the distance to the object 101 that is brought into focus from the position of the focus lens that is focused thereon. An object that is located at the center of an image or an object that is located nearest to the imaging device 200 may be brought into focus. For example, in the case where the AF control circuit 218 has the distance map of the object, the AF control circuit 218 may presume a region to which attention is paid from the distance map and may adjust the focus to the position thereof. If the position of the affected region 102 of the pressure ulcer in the live view image has been already identified by the image processing apparatus 300, the AF control circuit 218 may adjust the focus to the position thereof. The imaging device 200 repeatedly performs the AF process together with display of the live view image until it is detected that a release button is pushed at step S410 described later.

At step S404, the image-processing circuit 217 subsequently performs the development process on the date of an image that is imaged for live view image display and performs a compression process to generate image data of, for example, the JPEG standard. The image-processing circuit 217 performs a resizing process on the image data on which the compression process is performed to decrease the size of the image data. At step S406 described later, the image data after the resizing process is transmitted to the image processing apparatus 300 through wireless communication. At this time, the time of the wireless communication increases, as the size of the image data that is transmitted increases. Accordingly, the size of the image data that is decreased by the resizing process at step S404 is determined in consideration for permitted communication time.

At step S405, the system control circuit 220 subsequently obtains the image data that is generated at step S404 after the resizing process and the distance information that is obtained at step S403 by the distance measurement system 216. The system control circuit 220 obtains information about zoom magnification and information about the size (the number of pixels) of the image data after the resizing process as needed.

At step S406, the system control circuit 220 causes the communication device 219 to transmit one or more pieces of information including at least the image data and the distance information that are obtained at step S405 to the image processing apparatus 300 through wireless communication.

The processes at steps S404 to S406 may be performed for every frame or may be performed once every several frames.

The processes that are performed by the image processing apparatus 300 will now be described.

At step S441, the communication device 313 of the image processing apparatus 300 receives the image data and one or more pieces of information including the distance information that are transmitted from the communication device 219 at step S406 for the imaging device 200.

At step S442, the CPU 310 and the auxiliary arithmetic unit 317 of the image processing apparatus 300 identify the affected region 102 of the object 101 from the image data that is received at step S441. According to the present embodiment, for example, a process of identifying the affected region 102 is performed by using semantic segmentation of deep learning. For this reason, according to the present embodiment, a high-performance computer for learning, not illustrated, generates a learned model by learning a neural network model with images of the affected regions of actual pressure ulcers used as teacher data. The data of the learned model is stored in the main storage device 315 or the auxiliary storage device 316. An example of the neural network model is a fully convolutional network (FCN) that is a segmentation model of deep learning.

According to the present embodiment, the auxiliary arithmetic unit 317 that is excellent in parallel execution of the multiply-accumulate operation performs an inference process of deep learning. That is, the auxiliary arithmetic unit 317 receives the learned model that is stored in the main storage device 315 or the auxiliary storage device 316 via the arithmetic unit 311 and presumes the affected region 102 of the pressure ulcer from the image data on the basis of the learned model. The inference process may be performed by a FPGA or an ASIC. The semantic segmentation may be achieved by using another deep learning model. A segmentation method is not limited to deep learning and may be, for example, a graph cut, region growth, edge detection, or divide-and-conquer method. Other than these, the auxiliary arithmetic unit 317 may perform an internal learning process of the neural network model with the images of the affected regions of the pressure ulcers used as the teacher data.

Figure 5:
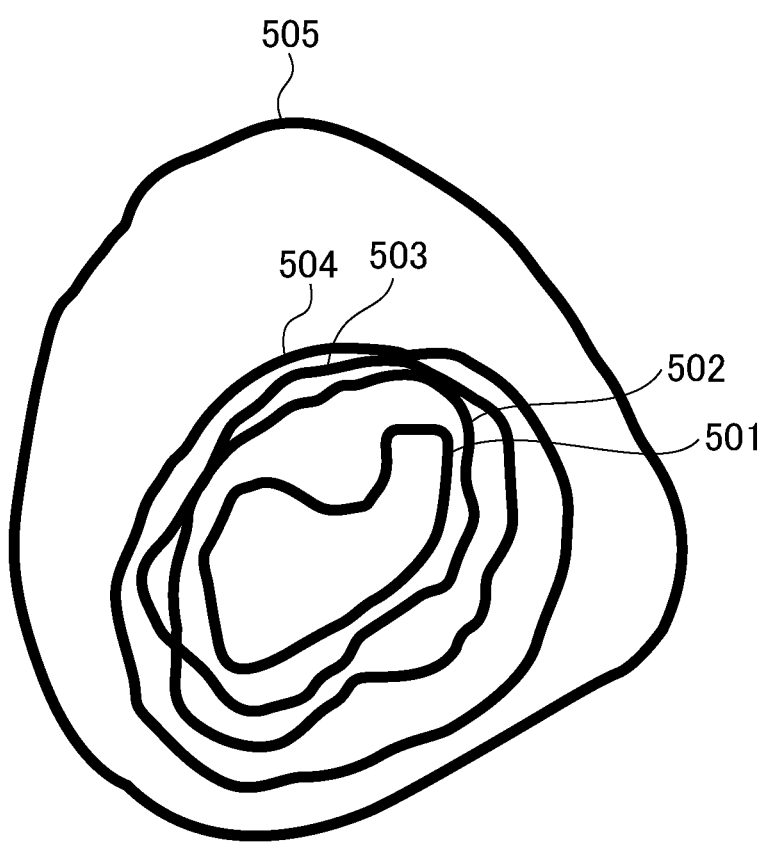
FIG. 5 illustrates an image of an affected region that is to be photographed and evaluated.

At step S443, the arithmetic unit 311 of the CPU 310 subsequently identifies boundary lines 501 to 505, as illustrated in FIG. 5, which correspond to outer edge candidates of the affected region 102 on the basis of the outer edge of the affected region 102 that is identified at step S442 by the auxiliary arithmetic unit 317.

FIG. 5 illustrates an image of the affected region that is to be photographed and evaluated according to the present embodiment. In many cases where the pressure ulcer becomes particularly serious, an exudate leaks at the center of the affected region 102 of the pressure ulcer, the color of the skin on the outside thereof changes with another exudate leaking, and the color of the skin on the outside thereof changes. The outer edge of the pressure ulcer in each state seems to define a closed curve. In an example in FIG. 5, the closed curve that is defined by the outer edge of the pressure ulcer in each state is represented as the boundary line 501, the boundary line 502, the boundary line 503, the boundary line 504, and the boundary line 505 in order from the center of the pressure ulcer to the periphery. That is, the boundary line 501, the boundary line 502, the boundary line 503, the boundary line 504, and the boundary line 505 correspond to lines that represent the external shape (shape of the outer edge) of the pressure ulcer in each state.

According to the present embodiment, when the auxiliary arithmetic unit 317 identifies the affected region 102 of the pressure ulcer on the basis of the above learned model at step S442, the region of the pressure ulcer in each state and the outer edge of the pressure ulcer in each state are also identified. At step S443, the arithmetic unit 311 identifies, as the boundary lines 501 to 505, the closed curve that is defined by the outer edge of the pressure ulcer in each state that is identified by the auxiliary arithmetic unit 317. At this time, the auxiliary arithmetic unit 317 presumes that which boundary line among the boundary lines 501 to 505 is most likely to be selected as the outer edge of the affected region 102 of the pressure ulcer by the user on the basis of the result of the inference process.

At step S444, the arithmetic unit 311 subsequently determines that regions surrounded by the boundary lines 501 to 505 that correspond to the outer edge candidates of the affected region 102 are the affected regions, and that regions containing the boundary lines are classified into temporary classes, with respect to the affected region 102. The arithmetic unit 311 saves information about the temporary classes of the boundary lines in the main storage device 315 or the auxiliary storage device 316. At this time, the arithmetic unit 311 also saves information that represents which class corresponds to the boundary line that is presumably most likely to be selected by the user at step S443. When the user designates a region at step S454 described later, classification is performed again, and a process for classification at step S444 may be simple.

At step S445, the communication device 313 transmits, to the imaging device 200, information about the result of identification of the affected region 102, the information about the classes corresponding to the boundary lines 501 to 505, and information about the class corresponding to the boundary line that is most likely to be selected. The communication device 313 also transmits, to the imaging device 200, image data into which the affected region 102 the external shapes of which correspond to the boundary lines 501 to 505 is classified, generated at step S444.

The following description returns to the processes that are performed by the imaging device 200.

At step S407, the communication device 219 of the imaging device 200 receives image data into which the affected region is classified by the image processing apparatus 300 if the image data is newly generated.

At step S408, the system control circuit 220 subsequently determines whether the image data of the above classes of the boundary lines 501 to 505 and the image data of the class corresponding to the boundary line that is most likely to be selected by the user have been received at step S407. If it is determined that the image data have been received, the system control circuit 220 causes the flow to proceed to step S409. If it is determined that the image data has not been received, the flow proceeds to step S410.

At step S409, the display device 223 displays the image data including the information about the classes of the affected region received at step S407 for a predetermined time under control of the system control circuit 220. At this time, an image of the boundary lines 501 to 505 illustrated in FIG. 5 is displayed so as to be superimposed on the image of the affected region 102. At this time, regarding to the class corresponding to the boundary line that is most likely to be selected by the user, display of the boundary line may be emphasized, the region of the class may be displayed by hatching, or the like for conspicuous display. In the case where there are the multiple boundary lines, the system control circuit 220 of the imaging device 200 may omit display of the boundary line that is most unlikely to be selected by the user.

At step S410, the system control circuit 220 subsequently detects whether the release button that is included in the operation unit 224 is pushed while the image on which the image of the boundary lines are superimposed in the affected region 102 is displayed for the predetermined time. If the release button is not pushed while the image is displayed for the predetermined time, the system control circuit 220 causes the flow to return to the process at step S404 that is performed by the imaging device 200. If the release button is pushed, the imaging device 200 performs the process at step S411.

At step S411, the distance measurement system 216 obtains the information about the distance to the object in the same manner as in step S403, and the AF control circuit 218 performs the AF process for drive control of the lens group 212 such that the object is brought into focus.

At step S412, the imaging device 200 subsequently photographs a still image.

At step S413, the image-processing circuit 217 subsequently performs the development and compression processes on image data that is obtained by photographing the still image at step S412 to generate image data of, for example, the JPEG standard. The image-processing circuit 217 performs the resizing process on the image data on which the compression process is performed to decrease the size of the image data. The size of the image data after the resizing process at step S413 is equal to or more than the size of the image data on which the resizing process is performed at step S404. The reason is that precision has priority when the size or area of the affected region 102 is obtained from the image. For example, the resizing process is performed to obtain a 4 bits RGB color image at 1440 pixels×1080 pixels such that the size of the image data is about 4.45 megabytes. However, the size of the image after the resizing process is not limited thereto.

At step S414, the system control circuit 220 subsequently obtains the image data after the resizing process at step S413 and the distance information that is obtained at step S411. The system control circuit 220 obtains the information about the zoom magnification and the information about the size (the number of pixels) of the image data after the resizing process as needed.

At step S415, the communication device 219 subsequently transmits one or more pieces of information including at least the image data and the distance information that are obtained at step S414 by the system control circuit 220 to the image processing apparatus 300 through wireless communication.

The following description returns again to the processes that are performed by the image processing apparatus 300.

At step S451, the communication device 313 of the image processing apparatus 300 receives the one or more pieces of information including the image data and the distance information that are transmitted from the communication device 219 of the imaging device 200.

At step S452, the CPU 310 and the auxiliary arithmetic unit 317 of the image processing apparatus 300 subsequently identify the affected region 102 of the object 101 from the image data that is received at step S451. The detail of the process is the same as that at step S442, and a description there of is omitted.

At step S453, the arithmetic unit 311 of the CPU 310 subsequently identifies the boundary lines 501 to 505, as illustrated in FIG. 5, which correspond to the outer edge candidates of the affected region 102 on the basis of the outer edge of the affected region 102 that is identified at step S452 by the auxiliary arithmetic unit 317. The detail of the process is the same as that at step S443, and a description there of is omitted.

At step S454, the arithmetic unit 311 subsequently determines that regions surrounded by the boundary lines 501 to 505 that are obtained at step S453 and that correspond to the outer edge candidates of the affected region 102 are the affected regions, and that regions containing the boundary lines are classified into classes. The arithmetic unit 311 saves information about the classes of the boundary lines in the main storage device 315 or the auxiliary storage device 316. At this time, the arithmetic unit 311 also saves information that represents which class corresponds to the boundary line that is presumably most likely to be selected by the user as in step S444.

At step S455, the communication device 313 transmits, to the imaging device 200, information about the result of identification of the affected region 102, the information about the classes corresponding to the boundary lines 501 to 505, and information about the class corresponding to the boundary line that is most likely to be selected. The communication device 313 also transmits, to the imaging device 200, image data into which the affected region 102 the external shapes of which correspond to the boundary lines 501 to 505 is classified, generated at step S454.

The following description returns to the processes that are performed by the imaging device 200.

At step S416, the communication device 219 of the imaging device 200 receives the image data into which the affected region is classified by the image processing apparatus 300.

At step S417, the display device 223 subsequently displays the image data including the information about the classes of the affected region received at step S416 for a predetermined time under control of the system control circuit 220. At this time, an image of the boundary lines 501 to 505 are displayed so as to be superimposed on the image of the affected region 102 as in step S409. At this time, regarding to the class corresponding to the boundary line that is most likely to be selected by the user, display of the boundary line may be emphasized, the region of the class may be displayed by hatching, or the like for conspicuous display. In the case where there are the multiple boundary lines, the system control circuit 220 may omit display of the boundary line that is most unlikely to be selected by the user also at step S417 as described above.

At step S418, the system control circuit 220 subsequently receives instruction information when the user inputs an instruction for designating the class that is to be saved as the image of the affected region 102 via the operation unit 224. The system control circuit 220 determines that the class that is designated by the user is saved as the image of the affected region 102. At this time, if the user designates the class corresponding to the boundary line among the boundary lines 501 to 505, the system control circuit 220 determines that the class is the class of the pressure ulcer that is to be photographed and evaluated this time. The class may be designated by receiving an input from the user on the image that is displayed on the display device 223 via a touch screen of the display device 223 or receiving designation from the user via another pointing device of the operation unit 224. The class may be designated in another manner. For example, a boundary line may be designated, or the outermost boundary line nearest to the position that is instructed by the user may be designated. The system control circuit 220 generates the image data of any one of the boundary lines 501 to 505 that is designated to correspond to the external shape of the affected region 102 by designation of the class from the user, regarding the affected region 102 that is identified by the image processing apparatus 300.

At step S419, the system control circuit 220 subsequently saves the image data that is obtained at step S412 and the class to be saved as the image of the affected region that is designated by the user, that is, information about the boundary line that is designated by the user as the optimum external shape among the boundary lines 501 to 505. The information is saved in the internal memory 221 or an external storage medium via the external memory I/F 222. The system control circuit 220 may save the information in an external save device other than the internal memory 221 and the external storage medium via the communication device 219. In this case, it is important to save the image data of the affected region and the information about the boundary line, and where these are saved is not limited.

At step S420, the display device 223 subsequently displays the image data that is received at step S416 and into which the affected region 102 is classified for a predetermined time. Here, the display device 223 displays the image illustrated in FIG. 5, and the flow returns to the process at step S402 after the predetermined time.

According to the first embodiment, the image processing apparatus 300 thus presumes the candidates of the external shape that can be selected as the outer edge of the affected region 102 during preview display such as display of the affected region 102 on the imaging device 200. On a preview screen of the imaging device 200, the boundary lines 501 to 505 that represent the outer edge candidates of the affected region 102 are displayed so as to be superimposed on the image of the affected region 102. Accordingly, the user such as the medical personnel can readily know whether the image of the affected region 102 can be photographed in a desired range. In this state, the imaging device 200 photographs the still image in the range desired for the user in response to the release operation of the user. The image processing apparatus 300 presumes the outer edge candidates in the still image that can be selected as the outer edge of the affected region 102. The boundary lines 501 to 505 corresponding to the candidates are displayed on the display device 223 of the imaging device 200. In this state, when the user designates the class corresponding to the desired boundary line, the image of the affected region of the designated class and the information about the boundary line corresponding to the class are displayed and saved. That is, the user evaluates the affected region 102 of, for example, the pressure ulcer on the basis of the image of the affected region that is displayed and saved. In this way, the affected-region-photographing apparatus 1 according to the first embodiment reduces the burden of the medical personnel and the burden of the patients to be evaluated and enables the size of the affected region of, for example, the pressure ulcer to be accurately evaluated. According to the present embodiment, the size of the affected region 102 is calculated on the basis of the program, and differences among individuals can be smaller than those in the case of measurement by manual work of, for example, the user, and evaluation of the size of the pressure ulcer can be more accurate. In addition, according to the present embodiment, the affected area, which serves as an indicator to more accurately represent the size of the pressure ulcer, can be calculated by image processing and displayed. A method of calculating the affected area will be described according to embodiments described later.

While a live view is displayed, the user does not necessarily confirm whether an area that presumably corresponds to the affected region is appropriate. Accordingly, the processes at steps S441 to S445 in FIG. 4A can be omitted.

The image processing apparatus 300 may store, in the storage device 312, the information about the result of identification of the affected region 102, information about the size of the affected region 102, and the image data of a superimposed image on which the information is superimposed. The output device 314 can output one or more pieces of the information or the image data stored in the storage device 312 to an output device such as a display that is connected. Displaying the superimposed image on the display enables another user other than the user who photographs the affected region 102 to obtain the image of the affected region 102 and the information about the size that have been obtained or in real time.

The arithmetic unit 311 of the image processing apparatus 300 may have a function of displaying a scale bar for freely changing the position and angle of the image data that is transmitted from the output device 314 to the display. Displaying the scale bar enables the user who see the display to measure the length of a freely selected portion of the affected region 102. The width of the scale of the scale bar may be automatically adjusted on the basis of, for example, the information about the zoom magnification and the distance information received at step S451 and the information about the size (the number of pixels) of the image data on which the resizing process is performed. In the case where the image processing apparatus 300 is used in a stationary state with power supplied thereto, there is no concern about a dead battery, and the image of the affected region 102 and the size information can be obtained any time. The image processing apparatus 300 is typically a stationary device, has a large amount of storage capacity, and can save a large number of pieces of image data. The same can be true for the other embodiments descried later.

Second Embodiment

In the following description by way of example, an affected-region-photographing apparatus 1 according to a second embodiment learns on the basis of the result of the instruction from the user and inference that is derived from the result of learning is reflected on successive photographing and evaluation. Structures and steps according to the second embodiment like to those according to the above first embodiment, for example, are designated by reference characters like to those in the description according to the first embodiment, and a duplicated description of the same structures and steps is appropriately omitted.

Figure 6A:
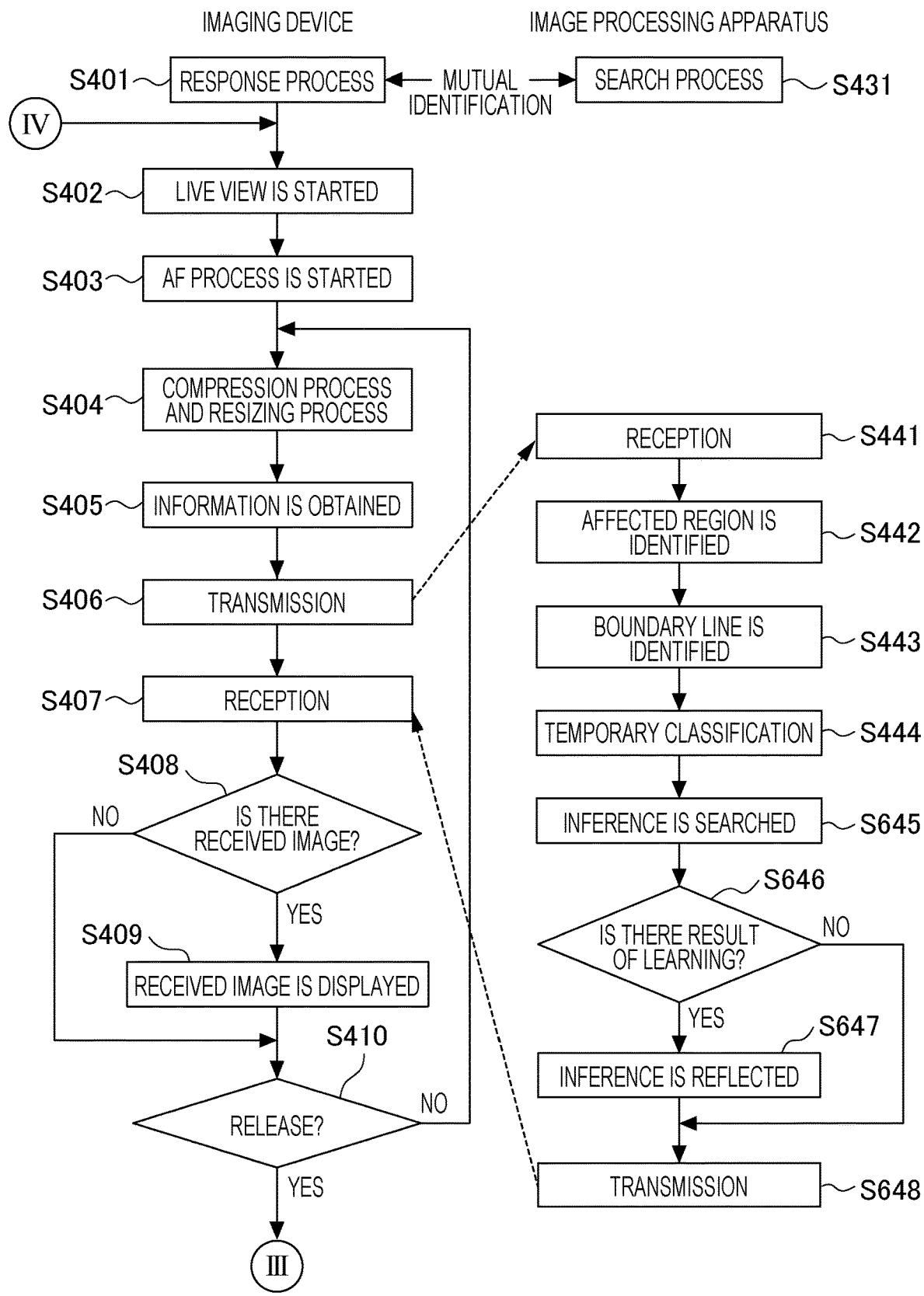
FIG. 6A and FIG. 6B illustrate a flowchart of operation of an affected-region-photographing apparatus according to a second embodiment.
Figure 6B:
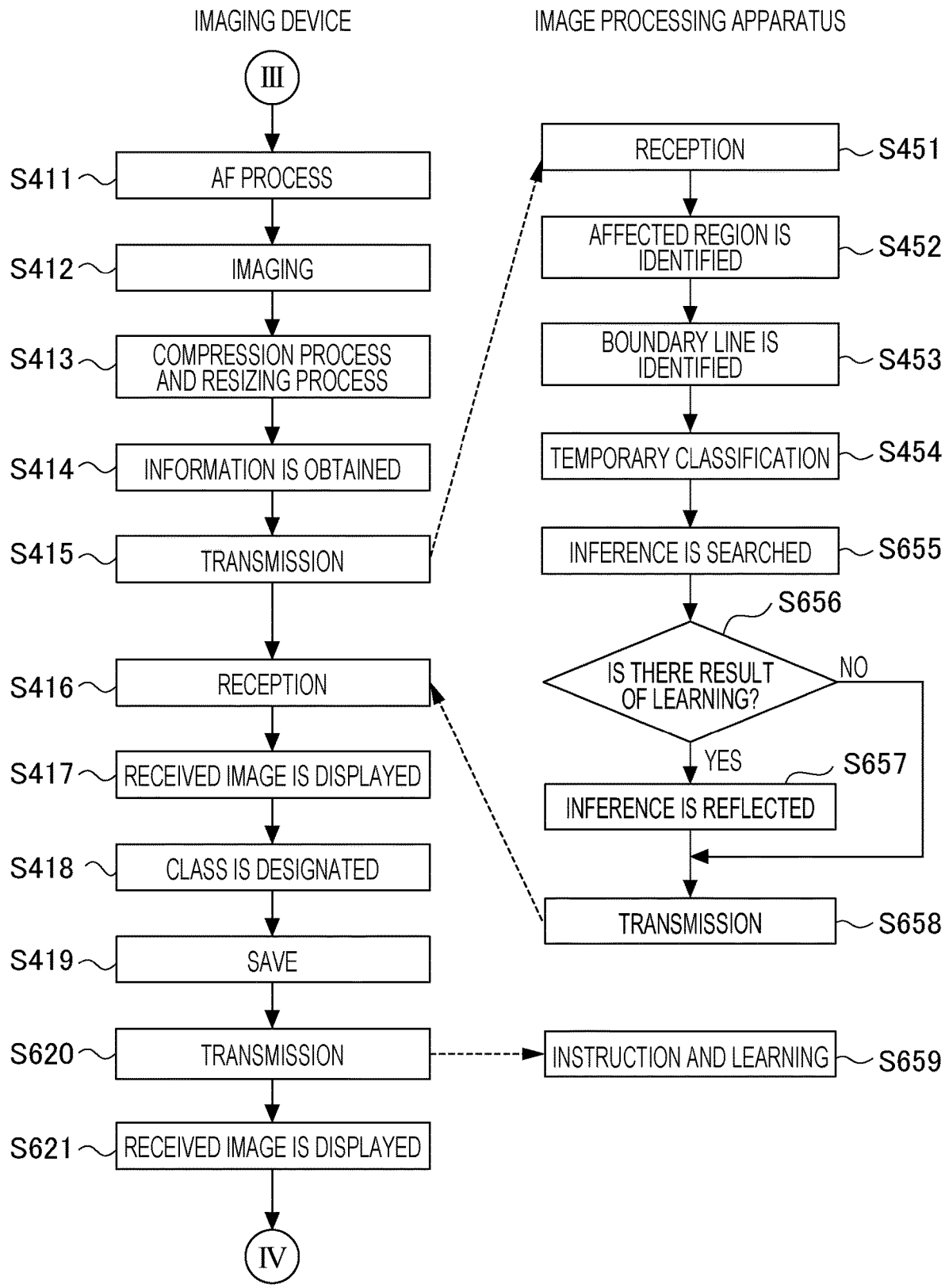

The following description with reference to FIG. 1 to FIG. 3, FIG. 5, FIG. 6A, and FIG. 6B includes a series of processes according to the second embodiment, for example, from photographing of the affected region to generating and saving of information for use in evaluation of the affected region and so on. FIG. 6A and FIG. 6B illustrate a flowchart of operation of the affected-region-photographing apparatus 1 according to the second embodiment. In FIG. 6A and FIG. 6B, processes at steps on the left-hand side of the flow are performed by the imaging device 200, and processes at steps on the right-hand side of the flow are performed by the image processing apparatus 300. The processes at steps S401 to S419, steps S431 to S444, and steps S451 to S454 are the same as the processes at the corresponding steps in FIG. 4A and FIG. 4B described above, and a description thereof is omitted.

According to the second embodiment, the processes at steps S401 to S406 are performed by the imaging device 200, the process at step S441 is subsequently performed by the image processing apparatus 300. After the process at step S444, a process at step S645 is performed.

At step S645, the arithmetic unit 311 of the image processing apparatus 300 searches information about the result of inference that represents the boundary line selected by the user in the past is any one of the boundary lines 501 to 505 in the main storage device 315 or the auxiliary storage device 316.

At step S646, the arithmetic unit 311 subsequently determines whether learning data that represents the boundary line selected by the user in the past is any one of the boundary lines 501 to 505 is in the main storage device 315 or the auxiliary storage device 316. If there are the learning data and the information about the result of inference based on the learning data, the arithmetic unit 311 causes the flow to proceed to step S647. If there is no learning data, the flow proceeds to step S648.

At step S647, the arithmetic unit 311 infers the boundary line that is most likely to be selected by the user among the boundary lines 501 to 505 on the basis of the learning data of the boundary line selected by the user in the past and reflects inference on the above class. The arithmetic unit 311 may attach a flag to the class corresponding to the inferred boundary line or may determine the order of each class by using metadata. At this time, the image processing apparatus 300 may cause the output device 314 to display the inferred boundary line that is emphasized, for example, by using a thick line or the class corresponding to the boundary line by hatching for selection of the user. The image processing apparatus 300 may gray out display of the other classes other than the class corresponding to the inferred boundary line. A method of displaying the class is not limited to these examples.

At step S648, the arithmetic unit 311 subsequently transmits, to the communication device 313, the information about the result of identification of the affected region 102 that is extracted, the information about the classes corresponding to the boundary lines 501 to 505, and the information about the class corresponding to the boundary line that is most likely to be selected by the user. The communication device 313 transmits the information to the imaging device 200.

After step S648, the imaging device 200 performs the process at step S407. The imaging device 200 performs the above processes at steps S407 to S415, and the image processing apparatus 300 subsequently performs the process at step S451. After the processes at steps S451 to S454, the image processing apparatus 300 performs a process at step S655.

At step S655, the arithmetic unit 311 of the image processing apparatus 300 searches the information about the result of inference that represents the boundary line selected by the user in the past is any one of the boundary lines 501 to 505 in the main storage device 315 or the auxiliary storage device 316.

At step S656, the arithmetic unit 311 subsequently determines whether learning data that represents the boundary line selected by the user in the past is any one of the boundary lines 501 to 505 is in the main storage device 315 or the auxiliary storage device 316. If there are the learning data and the information about the result of inference based on the learning data, the arithmetic unit 311 causes the flow to proceed to step S657. If there is no learning data, the flow proceeds to step S658.

At step S657, the arithmetic unit 311 infers the boundary line that is most likely to be selected by the user among the boundary lines 501 to 505 on the basis of the learning data of the boundary line selected by the user in the past and reflects inference on the above class as in step S647. At step S657, a flag may be attached to the class, the order may be determined by using metadata, display of the boundary line may be emphasized, the class may be displayed by hatching, or display of the class that does not correspond to a candidate is grayed out as described above.

At step S658, the arithmetic unit 311 transmits, to the communication device 313, the information about the result of identification of the affected region 102 that is extracted, the information about the classes corresponding to the boundary lines 501 to 505, and the information about the class corresponding to the boundary line that is most likely to be selected by the user. The communication device 313 transmits the information to the imaging device 200 as in step S648.

After step S658, the imaging device 200 performs the process at step S416. After the processes at steps S416 to S419, the imaging device 200 performs a process at step S620.

At step S620, the system control circuit 220 of the imaging device 200 transmits the information about the boundary line that is designated by the user among the boundary lines 501 to 505 to the communication device 219. The communication device 219 transmits the information to the image processing apparatus 300 through wireless communication. After step S620, the image processing apparatus 300 performs a process at step S659.

At step S659, the arithmetic unit 311 of the image processing apparatus 300 designates, as the affected region 102, the class that is surrounded by the boundary line that is designated by the user among the identified boundary lines 501 to 505. At the same time, the arithmetic unit 311 saves, as the learning data for use in inference at step S645 and step S655, the learning data including the information about the class corresponding to the boundary line that is designated by the user in the main storage device 315 or the auxiliary storage device 316.

After step S659, the flow returns to the process at step S620 that is performed by the imaging device 200. The imaging device 200 performs a process at step S621.

At step S621, the display device 223 of the imaging device 200 displays the image data into which the affected region 102 is classified and that is received at step S416 for a predetermined time. At this time, the display device 223 displays the above image illustrated in FIG. 5, and the flow returns to step S402 after the predetermined time.

The affected-region-photographing apparatus 1 according to the second embodiment thus learns on the basis of the result of selection of the user and reflects the inference that is derived from the result of learning on successive photographing and evaluation. Accordingly, the second embodiment can reduce the burden of the medical personnel and the burden of the patients to be evaluated more than the first embodiment, and the size of the affected region of, for example, the pressure ulcer can be more accurately evaluated.

Third Embodiment

An affected-region-photographing apparatus 1 according to a third embodiment will now be described.

According to the third embodiment, the imaging device 200 photographs the affected region 102 of the object 101, obtains information (for example, information about the position of touch in the case of release operation of touching a touch screen) at release, and transmits the data thereof to the image processing apparatus 300. The image processing apparatus 300 extracts affected regions from the received image data and identifies an affected region that is most likely to be correct and the external shape thereof by using the received information at release.

Structures and steps according to the third embodiment like to those according to the above embodiments, for example, are designated by reference characters like to those in the description according to the above embodiments, and a duplicated description of the same structures and steps is appropriately omitted.

The following description with reference to FIG. 1, FIG. 2, FIG. 3, FIG. 7A, and FIG. 7B includes a series of processes according to the third embodiment, for example, from photographing the affected region and generating and saving information for use in evaluation of the affected region.

The affected-region-photographing apparatus 1 according to the third embodiment obtains, as information at release in the imaging device 200, information about a position or a region that is instructed by the user such as the medical personnel (that is a photographer) on an image, although the detail will be described later. The affected-region-photographing apparatus 1 identifies the affected region 102 and the external shape on the basis of the information about the position or the region. According to the third embodiment, the CPU 310 of the image processing apparatus 300 runs a program that is stored in the storage device 312 to perform various functions including a process of identifying a region that is likely to be correct from the candidates of the affected region 102 that are extracted by the auxiliary arithmetic unit 317. According to the third embodiment, the display device 223 of the imaging device 200 is a touch screen including a touch sensor that can obtain the position of touch for obtaining the information about the position or the region that is instructed by the user (photographer) on the image. Naturally, a structure for obtaining the information about the position or the region that is instructed is not limited to a touch screen, and another structure may be acceptable provided that the information about the position or the region that is instructed by the user at release can be obtained.

Figure 7B:
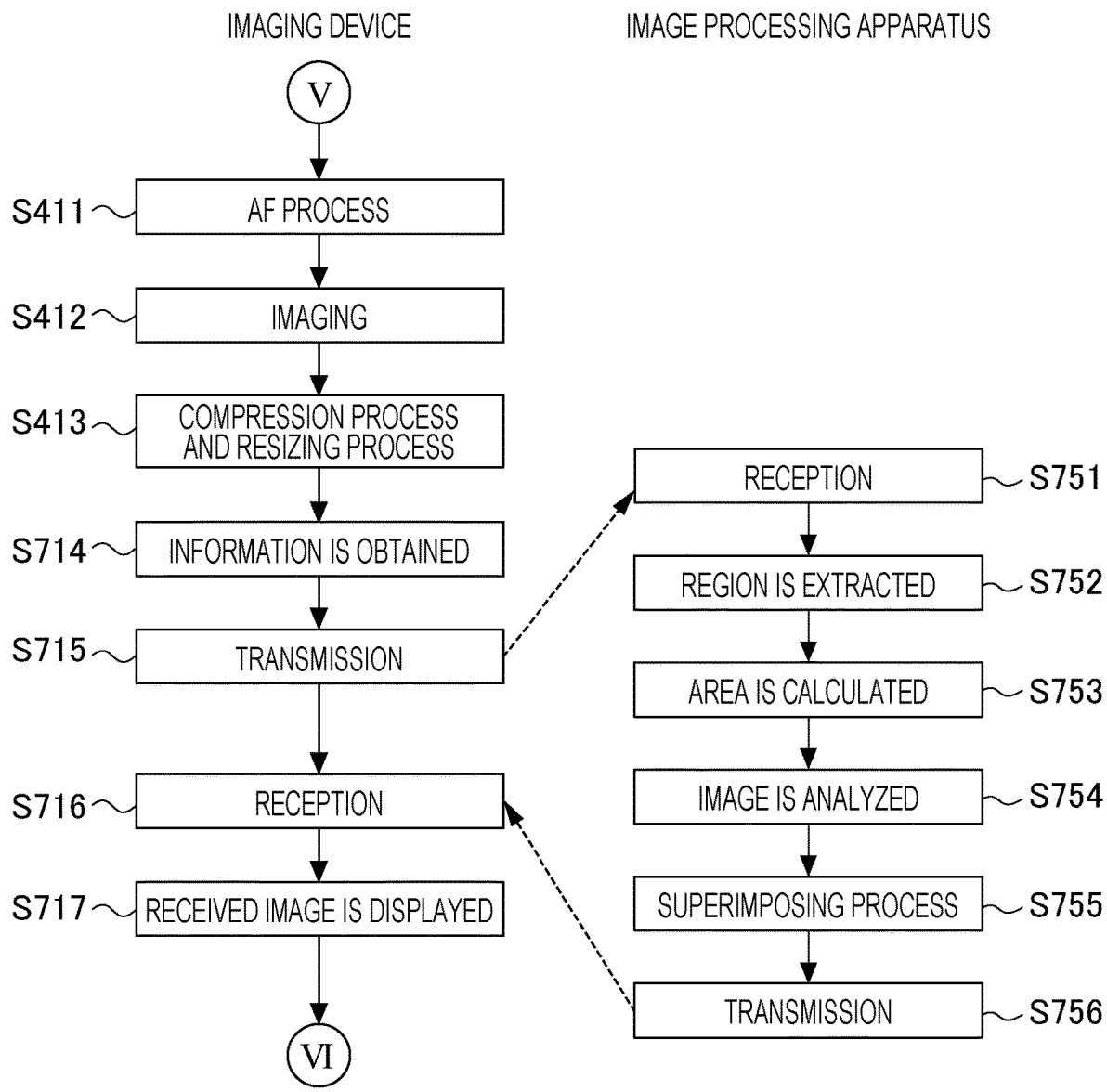

FIG. 7A and FIG. 7B illustrate a flowchart of operation of the affected-region-photographing apparatus 1 according to the third embodiment. In FIG. 7A and FIG. 7B, processes at steps on the left-hand side of the flow are performed by the imaging device 200, and processes at steps on the right-hand side of the flow are performed by the image processing apparatus 300. The processes at steps S401 to S406, steps S411 to S413, step S431, and step S441 are the same as the processes at the corresponding steps in FIG. 4A and FIG. 4B described above, and a description thereof is omitted.

According to the third embodiment, the imaging device 200 performs the processes at steps S401 to S406, and the image processing apparatus 300 subsequently performs the process at step S441.

At step S441, the communication device 313 of the image processing apparatus 300 receives the image data and one or more pieces of information including the distance information that are transmitted from the communication device 219 of the imaging device 200.

At step S742, the CPU 310 and the auxiliary arithmetic unit 317 of the image processing apparatus 300 subsequently extract the affected region 102 of the object 101 from the image data that is received at step S441. The auxiliary arithmetic unit 317 extracts the affected region 102 by using semantic segmentation of deep learning as in the above embodiments. The semantic segmentation of deep learning is the same as that described according to the first embodiment, and a description thereof is omitted.

In many cases where the semantic segmentation of deep learning is used, combinations of regions that are presumed to correspond to the affected region 102 and the reliability thereof are extracted. The size of the live view image that is displayed is small, and thus the live view image is to be a "standard" for photographing. At step S742, the auxiliary arithmetic unit 317 automatically selects a region candidate that is presumed to be most likely to be correct (that is, the reliability is highest).

At step S743, the arithmetic unit 311 of the CPU 310 subsequently calculates the area of the affected region 102 that is used as the information about the size of the affected region 102 that is extracted by the auxiliary arithmetic unit 317.

Figure 8:
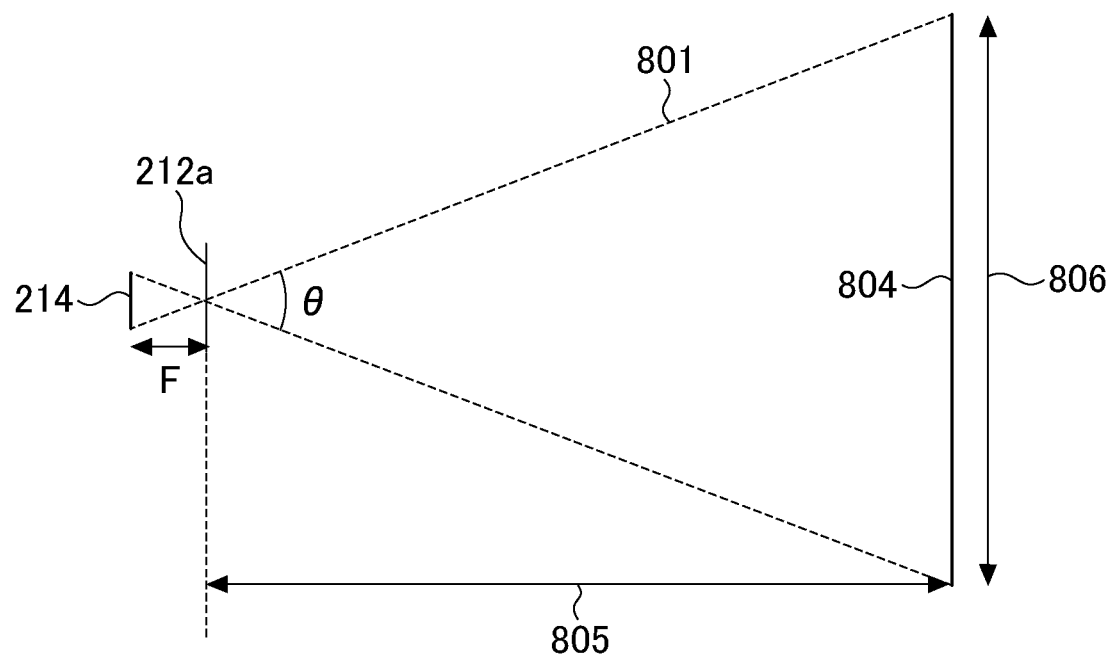
FIG. 8 illustrates a method of calculating the area of the affected region.

FIG. 8 illustrates a method of calculating the area of the affected region 102. The imaging device 200 is a typical camera and can be handled as a pinhole model illustrated in FIG. 8. Incident light 801 passes through a principal point of a lens 212a and is received by an imaging surface of the image sensor 214. It can be thought that two principal points of a front principal point and a rear principal point flush with each other if the lens group 212 approximates to the single lens 212a having no thickness. Adjustment of the focus position of the lens 212a such that an object image is imaged on a flat surface of the image sensor 214 enables the imaging device 200 to bring an object 804 into focus. When a focal length F from the imaging surface to the principal point of the lens changes, an angle of view θ changes and the zoom magnification changes. At this time, the width 806 of the object 804 on a focal plane is geometrically determined from a relationship between the angle of view θ of the imaging device 200 and an object distance 805. The width 806 of the object 804 can be calculated by using trigonometric functions. That is, the width 806 of the object 804 is determined by the relationship between the angle of view θ that varies depending on the focal length F and the object distance 805. The value of the width 806 of the object 804 is divided by the number of pixels in a line of the image data to obtain the length of the focal plane corresponding to one pixel of the image data.

Accordingly, the arithmetic unit 311 calculates the area of the affected region 102 by multiplying the number of pixels of the extracted region that is obtained from the result of extraction of the affected region at step S742 and the area of one pixel that is obtained from the length of the focal plane corresponding to one pixel of the image. The length of the focal plane corresponding to one pixel of the image may be obtained in advance for each combination of the focal length F and the object distance 805 and prepared as table data. In this case, the storage device 312 of the image processing apparatus 300 stores the table data depending on the imaging device 200 in advance.

The area of the affected region 102 is correctly obtained in the above manner on the assumption that the object 804 is a flat surface and the flat surface is perpendicular to the optical axis of the lens. When the distance information that is obtained from the imaging device 200 at step S441 is distance information or a distance map at positions in the image data, the arithmetic unit 311 detects change or inclination of the object in a depth direction and can calculate the area on the basis of the detected change or inclination.

At step S744, the arithmetic unit 311 subsequently generates image data obtained by superimposing the information that represents the result of extraction of the affected region 102 and the information about the size of the affected region 102 on image data from which the affected region 102 is to be extracted.

Figure 9A:
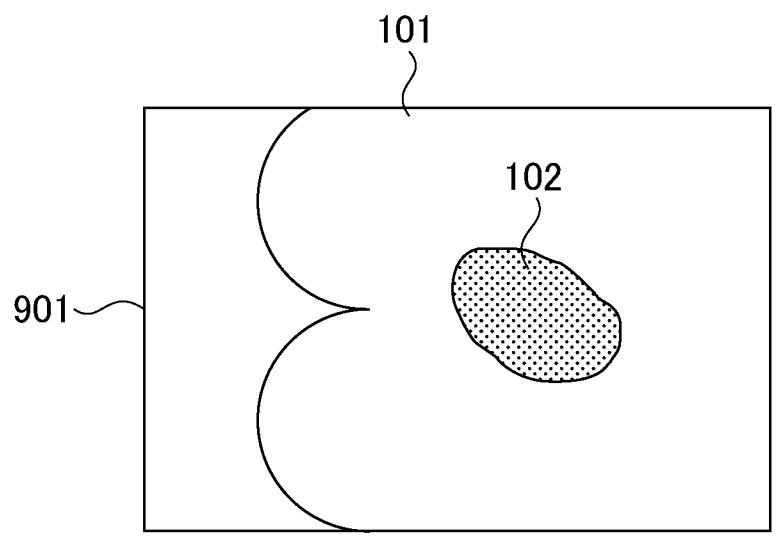
FIG. 9A and FIG. 9B illustrate an example in which a result of extraction of the affected region and size information are superimposed on an image.
Figure 9B:
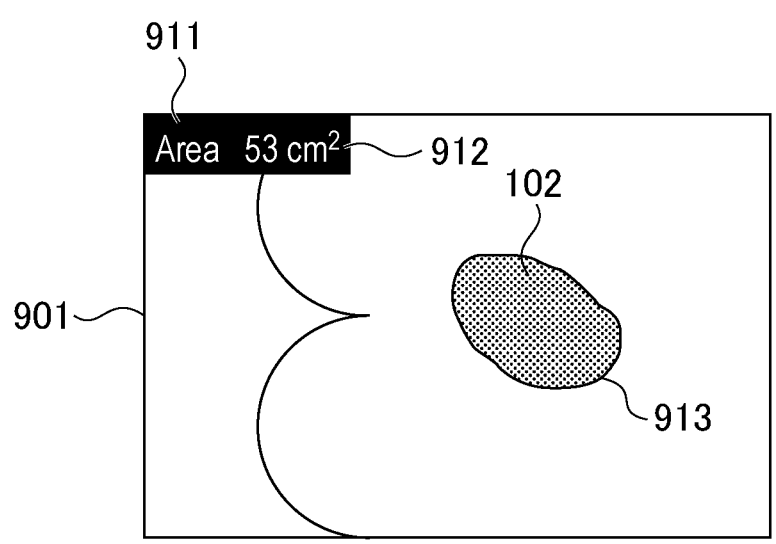

FIG. 9A and FIG. 9B illustrate a method of superimposing the information about the result of extraction of the affected region 102 and the information about the size of the affected region 102 on the image data. An image 901 in FIG. 9A is displayed by way of example by using the image data before a superimposing process and contains the object 101 and the affected region 102. A superimposed image 902 in FIG. 9B is based on the image data after the superimposing process. In this example, there is a single candidate of the affected region 102. However, in the case where there are candidate regions that are likely to correspond to the affected region, the arithmetic unit 311 may perform the superimposing process on the candidate regions or may perform the superimposing process only on the candidate region that is most likely to correspond to the affected region.

As illustrated in FIG. 9B, a label 911 in which a character string 912 of the area value of the affected region 102 is displayed in white color on a black background is superimposed as the information about the size of the affected region 102 on the upper left of the superimposed image 902. The colors of the background and the character string in the label 911 are not limited to black and white colors provided that the colors are easy to see. Transparency of the colors of the background and the character string in the label 911 may be set for alpha blending to enable a portion at which the label is superimposed to be seen.

As illustrated in FIG. 9B, an indicator 913 that represents a presumption area of the affected region 102 that is extracted at step S742 is superimposed on the superimposed image 902. That is, the superimposed image 902 is obtained by superimposing the indicator 913 that represents the presumption area and the image data from which the image 901 is created by using alpha blending at the position of the area that presumably corresponds to the affected region. This enables the user to confirm whether the presumption area from which the area of the affected region 102 is obtained is appropriate. In one embodiment, the color of the indicator 913 that represents the presumption area does not overlap the color of the object. The value of transparency in alpha blending ranges such that the presumption area can be identified, and the original affected region 102 can also be seen. Display of the superimposed indicator 913 that represents the presumption area of the affected region 102 enables the user to confirm whether the presumption area is appropriate without display of the label 911, and a process at step S743 may be omitted.

At step S745, the communication device 313 of the image processing apparatus 300 subsequently transmits the information that represents the result of extraction of the affected region 102 that is extracted as described above and the information about the size of the affected region 102 to the imaging device 200. That is, the communication device 313 transmits the image data that is generated at step S744 and that includes the information about the size of the affected region 102 to the imaging device 200 through wireless communication. After step S745, the imaging device 200 performs a process at step S707.

At step S707, the communication device 219 of the imaging device 200 receives image data including the information about the size of the affected region 102 if the image data is newly generated by the image processing apparatus 300.

At step S708, the system control circuit 220 subsequently determines whether the image data including the information about the size of the affected region 102 is received at step S707. If the image data is received, the system control circuit 220 performs a process at step S709. If the image data is not received, a process at step S710 is performed.

At step S709, the display device 223 displays the image data including the information about the size of the affected region 102 that is received at step S707 for a predetermined time. Here, the display device 223 displays the superimposed image 902 illustrated in FIG. 9B. According to the third embodiment, the information that represents the result of extraction of the affected region 102 is superimposed on the live view image and displayed. This enables the user to confirm whether the area of the affected region and the presumption area are appropriate by using a preview image before photographing. In an example described according to the present embodiment, the indicator 913 that represents the presumption area of the affected region 102 and the information about the size of the affected region 102 are displayed. However, any one of these may be displayed. After step S709, the imaging device 200 performs the process at step S710.

At step S710, the system control circuit 220 determines whether the photographer such as the user inputs the release operation by using the operation unit 224. If the system control circuit 220 determines that the release operation is not inputted, the flow returns to the process at step S404 that is performed by the imaging device 200. If the release operation is inputted, the imaging device 200 performs the process at step S411.

Figure 10:
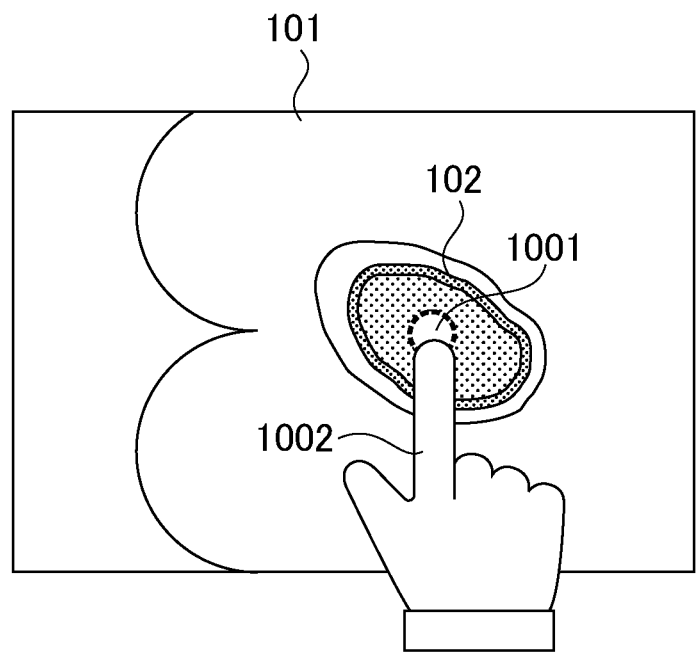
FIG. 10 illustrates an example of release operation in the imaging device.
Figure 11:
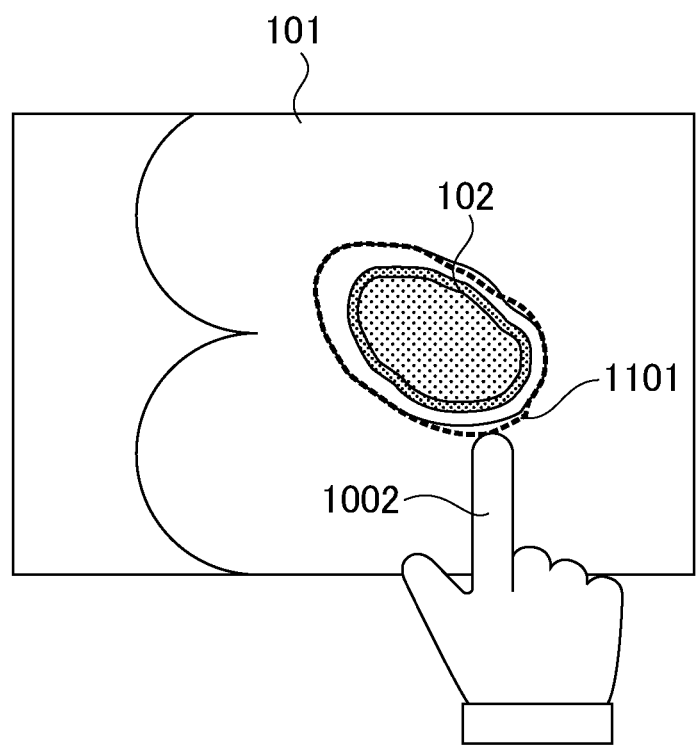
FIG. 11 illustrates another example of the release operation in the imaging device.

According to the third embodiment, the release operation is illustrated in FIG. 10 and FIG. 11. In an example described according to the present embodiment, the operation unit 224 is a touch screen that is shared with the display device 223 for simplicity of the description. However, the structure of the operation unit 224 is not limited thereto.

FIG. 10 illustrates an example of the live view image that is displayed on the display device 223 that includes the touch screen of the operation unit 224 and illustrates an example in which the photographer such as the user touches the touch screen at a desired position by using, for example, a finger 1002 for release. At this time, for example, the imaging device 200 displays a message or outputs a sound to request the photographer to touch at any position in the region that is determined to correspond to the affected region by oneself for the release operation. In response to the touch operation of the photographer, the system control circuit 220 obtains information about the position of the touch as touch position information 1001 at release.

FIG. 11 illustrates an example of the live view image as in FIG. 10 and illustrates another example of the release operation that differs from that in FIG. 10. FIG. 11 differs from FIG. 10 in that release is done when the touch screen is touched. In the example in FIG. 11, the photographer does not release the finger 1002 while touching and moves the finger along the edge of the region that is determined to correspond to the affected region 102 by oneself for sliding operation. At this time, for example, the imaging device 200 displays a message or outputs a sound to request the photographer to move the finger 1002 along the edge of the region that is determined to correspond to the affected region 102 by oneself for the sliding operation. As illustrated in the example in FIG. 11, when the trajectory of the sliding operation of the photographer along the outer edge of the region that is likely to correspond to the affected region 102 with the finger 1002 touching forms a closed shape, the system control circuit 220 determines that an instruction for release is inputted and images an image. The system control circuit 220 obtains, as touch region information 1101 at release, information about the position of the region of the closed shape that is surrounded by the trajectory of the sliding operation in which the finger 1002 moves while touching.

Returning to the description of FIG. 7A and FIG. 7B, the processes at steps S411 to S413 after step S710 are the same as those described above with reference to FIG. 4A and FIG. 4B, and a detailed description thereof is omitted. After step S413, the imaging device 200 performs a process at step S714.

At step S714, the system control circuit 220 obtains the image data that is generated at step S413 after the resizing process, the distance information that is obtained at step S411, and the touch position information 1001 or the touch region information 1101 that is obtained at step S710. The system control circuit 220 obtains the information about the zoom magnification and the information about the size (the number of pixels) of the image data on which the resizing process is performed.

At step S715, the communication device 219 subsequently transmits the image data that is obtained at step S714, the distance information, and information including the touch position information or the touch region information to the image processing apparatus 300 through wireless communication.

After step S715, the image processing apparatus 300 performs processes at steps S751 to S756.

In the process at step S751, the communication device 313 of the image processing apparatus 300 receives the image data, the distance information, and the touch position information or the touch region information that are transmitted from the communication device 219 of the imaging device 200.

At step S752, the CPU 310 and the auxiliary arithmetic unit 317 of the image processing apparatus 300 subsequently extract the affected region 102 of the object 101 from the image data that is received at step S751. The affected region 102 is extracted by the auxiliary arithmetic unit 317 in the same manner as in step S742 (the semantic segmentation of deep learning) described above. At step S742, the region candidate that is presumably most likely to correspond to the affected region (reliability is highest) is automatically selected. However, a region that is intended by the photographer is selected here by using a larger amount of the image data and the touch position information or the touch region information.

For example, in the case where the touch position information is received, the photographer such as the user is requested to touch the affected region 102 at any position as described above. For this reason, it can be said that there is a high possibility that the touch position is within the affected region, and that a region that has a feature generally similar to that of an image feature at the touch position, that is, a region in which a feature that is the same as or approximates to the image feature at the touch position is continuous has a high degree of certainty that the region corresponds to the affected region. It can be said that a region that has a feature different from the image feature at the touch position, that is, a region that has a feature that is not continuous with the image feature at the touch position has a low degree of certainty that the region corresponds to the affected region. Accordingly, the auxiliary arithmetic unit 317 excludes the region in which the feature is not continuous with and differs from the image feature at the touch position from the candidate regions of the affected region. Alternatively, the auxiliary arithmetic unit 317 decreases the value of reliability that represents the degree of certainty of the region in which the feature is not continuous with and differs from the image feature at the touch position. The auxiliary arithmetic unit 317 may increase the value of reliability that represents the degree of certainty of the region in which the feature that is the same as or approximates to the image feature at the touch position is continuous. Naturally, these examples do not limit a process in which the touch position is within a region that has a high priority of the candidate region. The auxiliary arithmetic unit 317 determines that a region that has the highest reliability among the candidate regions is shown to the photographer after the process of exclusion from the candidate regions or the process of increasing or decreasing the value of the reliability.

For example, in the case where the touch region information is received, the photographer is requested to move the finger along the edge of the region that is determined to correspond to the affected region by oneself as described above. For this reason, it can be said that a region that has a feature generally similar to that of the region surrounded by the trajectory of the sliding operation in response to the request and that has a large part overlapping the region surrounded by the trajectory of the sliding operation has a high degree of certainty that the region corresponds to the affected region (reliability is high). It can be said that a region that has the feature generally similar to that of the region surrounded by the trajectory of the sliding operation and that has a small part overlapping the region surrounded by the trajectory of the sliding operation has a low degree of certainty that the region corresponds to the affected region. For this reason, the auxiliary arithmetic unit 317 obtains a degree at which the region that has the feature generally similar to that of the region surrounded by the trajectory of the sliding operation overlaps the region surrounded by the trajectory of the sliding operation. The auxiliary arithmetic unit 317 excludes a region that overlaps the region surrounded by the trajectory of the sliding operation at a degree smaller than a threshold from the candidate regions of the affected region. Alternatively, the auxiliary arithmetic unit 317 decreases the value of reliability by a larger amount as the degree at which the region overlaps the region surrounded by the trajectory of the sliding operation decreases. The auxiliary arithmetic unit 317 may increase the value of reliability by a larger amount as the degree at which the region overlaps the region surrounded by the trajectory of the sliding operation increases. The auxiliary arithmetic unit 317 determines that a region that has the highest reliability among the candidate regions is shown to the photographer after the process of exclusion from the candidate regions or the process of increasing or decreasing the value of the reliability as described above.

At step S753, the arithmetic unit 311 of the CPU 310 subsequently calculates the area of the affected region 102 as an example of the information about the size of the affected region 102 that is extracted at step S752. A process of calculating the area is the same as in step S743 described above, and a description thereof is omitted.

At step S754, the arithmetic unit 311 carries out image analysis to calculate the major axis length and the minor axis length of the above extracted affected region 102 and the area of a rectangle in contact with the affected region 102 on the outside on the basis of the length of the focal plane corresponding to one pixel of the image that is obtained at step S753. The size of the affected region, which is one of the indicators for evaluating the affected region in the DESIGN-R described above, is defined to be the product of the major axis length and the minor axis length. In the affected-region-photographing apparatus 1 according to the present embodiment, analysis of the major axis length and the minor axis length enables compatibility with data that has been measured by the DESIGN-R to be ensured. The DESIGN-R is not strictly defined, and several methods for calculating the major axis length and the minor axis length can be thought mathematically.

In an example, the major axis length and the minor axis length are calculated as follows. The arithmetic unit 311 calculates a rectangle (minimum bounding rectangle) that has the minimum area among rectangles in contact with the affected region 102 on the outside. The arithmetic unit 311 calculates the lengths of a long side and a short side of the rectangle, determines that the major axis length is equal to the length of the long side, and that the minor axis length is equal to the length of the short side. The arithmetic unit 311 calculates the area of the rectangle on the basis of the length of the focal plane corresponding to one pixel of the image that is obtained at step S753.

In another example, the arithmetic unit 311 may calculate the major axis length and the minor axis length such that the major axis length is equal to the maximum Feret diameter, that is, the maximum caliper length, and the minor axis length is equal to the minimum Feret diameter. The arithmetic unit 311 may determine that the major axis length is equal to the maximum Feret diameter, that is, the maximum caliper length, and the minor axis length is equal to a length that is measured in a direction perpendicular to an axis having the maximum Feret diameter. The major axis length and the minor axis length can be calculated in a freely selected manner on the basis of compatibility with the existing measurement results.

Regarding the image data that is received at step S441, the major axis length and the minor axis length of the above affected region 102 and the area of the rectangle are not calculated. That is, the live view image is displayed for the user to see the result of extraction of the affected region 102, and the process of an image analysis step at step S754 is omitted to decrease a process time.

At step S755, the arithmetic unit 311 generates an image by superimposing the information about the result of extraction of the region that is determined to be most likely to correspond to the affected region 102 at step S752 and the information about the size on the image data from which the affected region 102 is extracted.

Figure 12A:
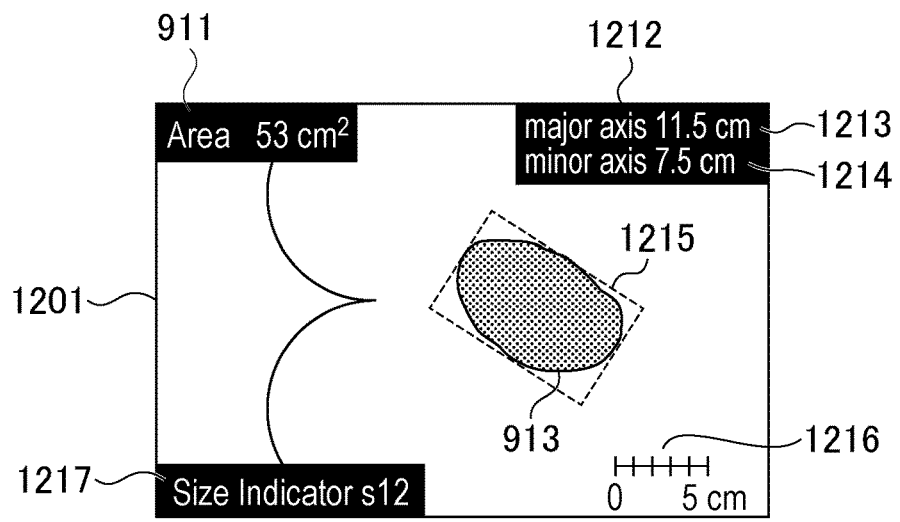
FIG. 12A, FIG. 12B, and FIG. 12C illustrate examples in which the affected region, a major axis length, and a minor axis length are superimposed on an image.
Figure 12B:
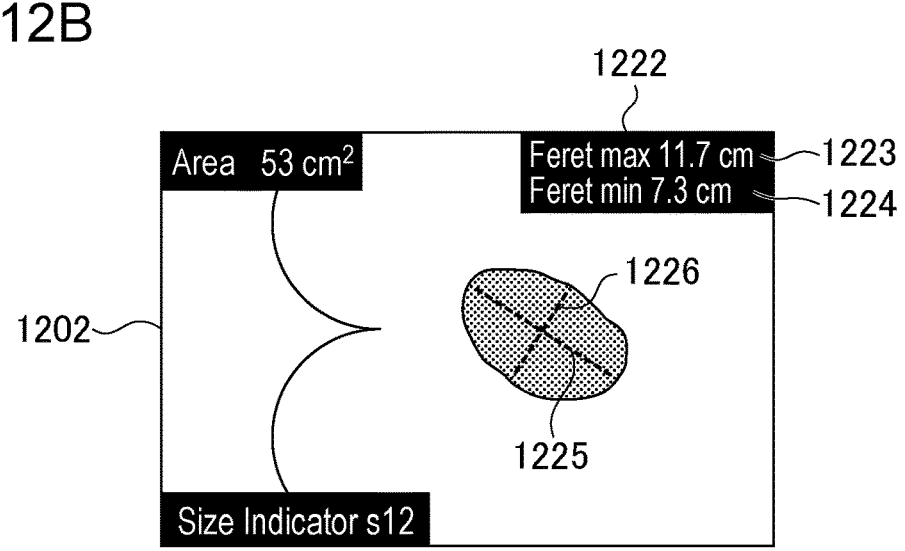
Figure 12C:
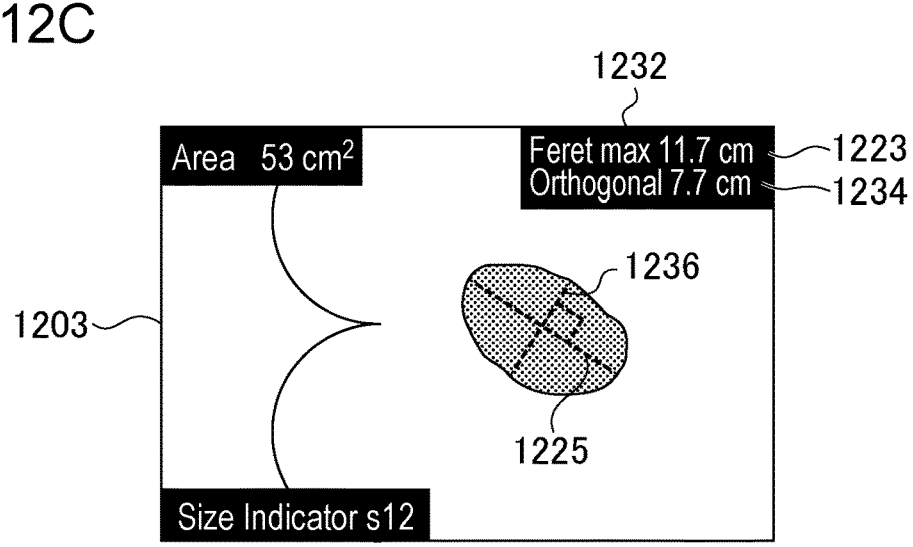

FIG. 12A to FIG. 12C illustrate a method of superimposing the information that represents the result of extraction of the affected region 102 and the information about the size of the affected region including the major axis length and the minor axis length of the affected region 102 on the image data. It can be thought that there are pieces of the information about the size of the affected region 102. Accordingly, the description is divided for a superimposed image 1201 in FIG. 12A, a superimposed image 1202 in FIG. 12B, and a superimposed image 1203 in FIG. 12C.

The superimposed image 1201 in FIG. 12A is an example in the case of using the minimum bounding rectangle as the method of calculating the major axis length and the minor axis length. The label 911 in which a character string of the area value of the affected region 102 is displayed in white color on a black background is superimposed as the information about the size of the affected region 102 on the upper left of the superimposed image 1201 as in the example in FIG. 9B. A label 1212 in which the major axis length and the minor axis length that are calculated on the basis of the minimum bounding rectangle is displayed is superimposed as the information about the size of the affected region 102 on the upper right of the superimposed image 1201 and displayed. A character string 1213 represents the major axis length (unit is centimeter), and a character string 1214 represents the minor axis length (unit is centimeter). In the superimposed image 1201, a rectangle frame 1215 that represents the minimum bounding rectangle is displayed in the affected region 102. The rectangle frame 1215 is superimposed together with the major axis length and the minor axis length, and the user can see which portion in the image is measured in length.

A scale bar 1216 is superimposed on the lower right of the superimposed image 1201. The scale bar 1216 is used to measure a size as the information about the size of the affected region 102. The size of the scale bar for the image data is changed depending on the distance information. Specifically, the scale bar 1216 has a scale in units of centimeters up to five centimeters, is based on the length of the focal plane corresponding to one pixel of the image that is obtained at step S753, and corresponds to the size of the focal plane of the imaging device, that is, the object. The user can roughly grasp the size of the object 101 or the affected region 102 by referring the scale bar.

The indicator for evaluating the size in the DESIGN-R described above is superimposed and displayed as a label 1217 on the lower left of the superimposed image 1201. The indicator for evaluating the size in the DESIGN-R is classified into the above seven stages from the numeral value of the product of the major axis length and the minor axis length (the maximum length on the axis perpendicular to the major axis) that are measured (unit is centimeter) in the range of the skin injury. According to the present embodiment, an indicator that is obtained by converting the major axis length and the minor axis length into the values that are outputted by the respective calculation methods is superimposed and displayed as the label 1217.

In the superimposed image 1202 in FIG. 12B, the major axis length is the maximum Feret diameter, and the minor axis length is the minimum Feret diameter. A label 1222 in which a character string 1223 of the major axis length and a character string 1224 of the minor axis length are displayed is superimposed on the upper right of the superimposed image 1202. In the affected region 102 in the superimposed image 1202, an auxiliary line 1225 corresponding to the position at which the maximum Feret diameter is measured and an auxiliary line 1226 corresponding to the minimum Feret diameter are displayed. Superimposing the auxiliary lines together with the major axis length and the minor axis length as above enables the user to see which portion in the image is measured in length.

In the superimposed image 1203 in FIG. 12C, the minor axis length is measured in a direction perpendicular to the axis of the maximum Feret diameter instead of the minimum Feret diameter, although the major axis length is the same as that in the superimposed image 1202. A label 1232 in which the character string 1223 of the major axis length and a character string 1234 of the minor axis length are displayed is superimposed on the upper right of the superimposed image 1203. In the affected region 102 in the superimposed image 1203, the auxiliary line 1225 corresponding to the position at which the maximum Feret diameter is measured and an auxiliary line 1236 corresponding to the length that is measured in the direction perpendicular to the axis of the maximum Feret diameter are displayed.

Among the pieces of information that are superimposed on the image data illustrated in FIG. 12A to FIG. 12C, any one of the pieces of information or a combination thereof suffices. The user may select information to be displayed. The superimposed images are illustrated in FIG. 9A, FIG. 9B, and FIG. 12A to FIG. 12C by way of example. Accordingly, the display form of the affected region 102 and the information about the size of the affected region 102, the position of display, the size, a font, a font size, a font color, a positional relationship, and so on may be changed depending on various conditions.

Returning to the description of FIG. 7A and FIG. 7B, at step S756, the communication device 313 of the image processing apparatus 300 transmits the information that represents the result of extraction of the extracted affected region 102 and the information about the size of the affected region 102 to the imaging device 200. According to the present embodiment, the communication device 313 transmits the image data including the information about the size of the affected region 102 that is generated at step S755 to the imaging device 200 through wireless communication.

After step S756, the imaging device 200 performs a process at step S716.

In the process at step S716, the communication device 219 of the imaging device 200 receives the image data including the information about the size of the affected region 102 that is generated by the image processing apparatus 300.

At step S717, the display device 223 subsequently displays the image data including the information about the size of the affected region 102 that is received at step S716 for a predetermined time. At this time, the display device 223 displays any one of the superimposed images 1201 to 1203 illustrated in FIG. 12A to FIG. 12C. After the predetermined time, the flow returns to the process at step S402 that is performed by the imaging device 200.

According to the third embodiment, the information about the position that is instructed on the image by the user (photographer) is obtained at release in the imaging device 200 as described above. The affected region 102 and the outer edge are presumed on the basis of the information about the instructed position. That is, according to the third embodiment, the affected region 102 and the outer edge are presumed on the basis of the information about the position that is designated by the user described above, and a region that is closest to the affected region that is intended by the user can be identified. The display device 223 of the imaging device 200 displays the information about the size of the affected region. Consequently, according to the third embodiment, the burden of the user and the burden of the patients to be evaluated are reduced when the size of the affected region 102 is evaluated. According to the third embodiment, the size of the affected region is calculated on the basis of the program as in the above embodiments. Accordingly, and differences among individuals can be smaller than those in the case of measurement by manual work of the user, and evaluation of the size of the affected region 102 can be more accurate.

The function of allowing the user to confirm whether the presumption area of the affected region is appropriate while the live view is displayed is not essential, and the processes at steps S441 to S745 may be omitted. The image processing apparatus 300 may store, in the storage device 312, the information that represents the result of extraction of the affected region 102, the information about the size of the affected region 102, and the image data of the superimposed image on which the information is superimposed. The output device 314 can output one or more pieces of the information that are stored in the storage device 312 or the image data to the output device such as the display that is connected.

Fourth Embodiment

In the example described according to the third embodiment above, the image processing apparatus 300 superimposes the information that represents the result of extraction of the affected region and the information about the size of the affected region on the image for display. In an example described according to a fourth embodiment described below, however, the image-processing circuit 217 of the imaging device 200 performs a process of superimposing the information that represents the result of extraction of the affected region 102 and the information about the size of the affected region on the image for display.

Figure 13A:
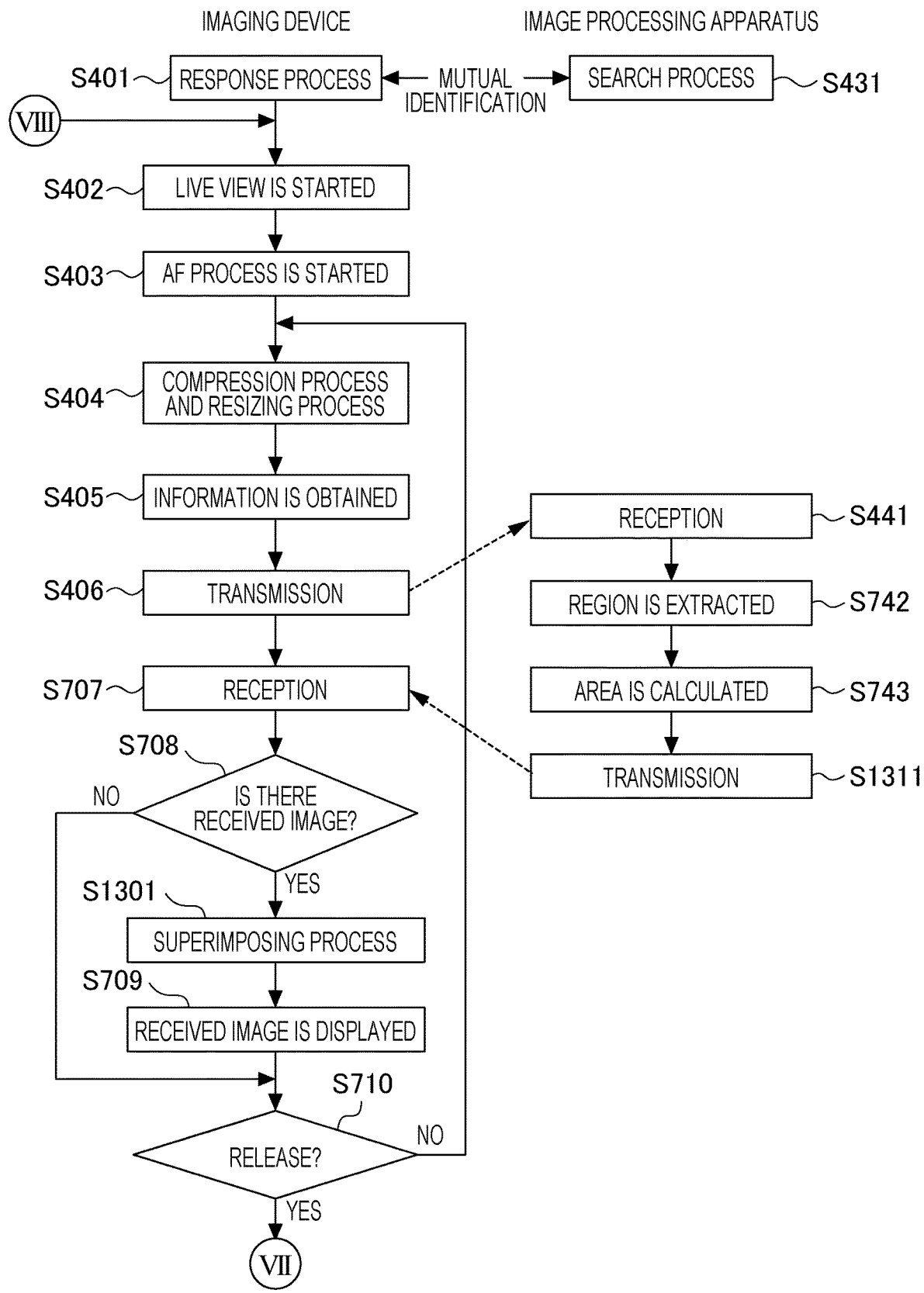
FIG. 13A and FIG. 13B illustrate a flowchart of operation of an affected-region-photographing apparatus according to a fourth embodiment.
Figure 13B:
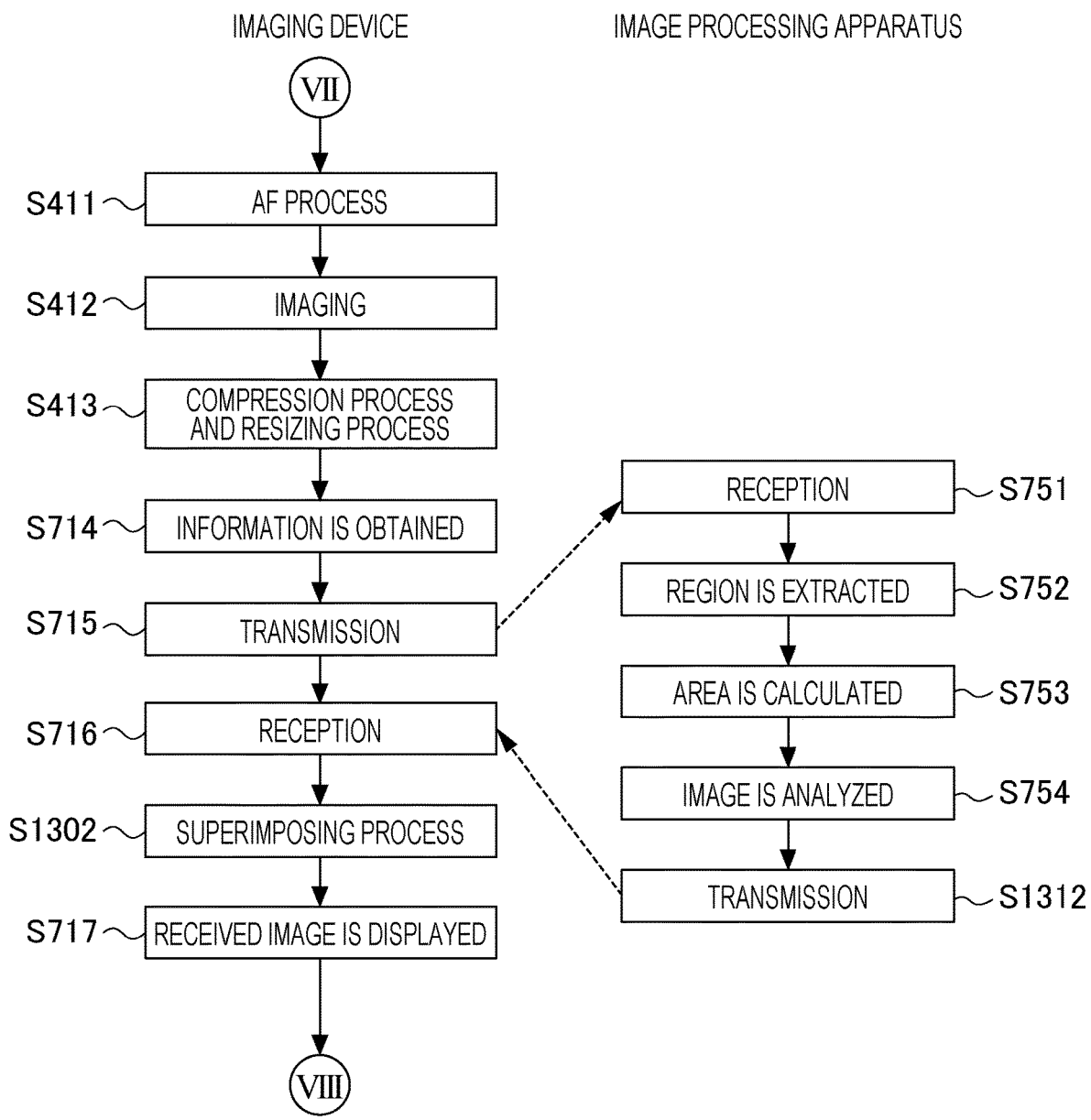

FIG. 13A and FIG. 13B illustrate a flowchart of operation of an affected-region-photographing apparatus 1 according to a fourth embodiment. In FIG. 13A and FIG. 13B, processes at steps on the left-hand side of the flow are performed by the imaging device 200, and processes at steps on the right-hand side of the flow are performed by the image processing apparatus 300. In the flowchart in FIG. 13A and FIG. 13B, the superimposing process that is performed by the image processing apparatus 300 at step S744 and step S755 is removed from the processes in FIG. 7A and FIG. 7B, and the superimposing process that is performed by the imaging device 200 at step S1301 and step S1302 is added instead. A process for transmission at step S1311 and step S1312 is added instead of the process for transmission that is performed by the image processing apparatus 300 at step S745 and step S756. Among the steps illustrated in FIG. 13A and FIG. 13B, at steps that are designated by reference characters like to those in the steps illustrated in FIG. 7A and FIG. 7B, the same processes as those at the corresponding steps in FIG. 7A and FIG. 7B are performed.

According to the fourth embodiment, the imaging device 200 generates the superimposed image, and the data that is transmitted from the image processing apparatus 300 to the imaging device 200 at step S1311 and step S1312 is not needed to be color scale image data. According to the fourth embodiment, the image processing apparatus 300 does not transmit the image data but transmits metadata related to the size of the presumed affected region and data that represents the position of the affected region. For this reason, according to the fourth embodiment, communication traffic is reduced, and a communication speed increases. The data that represents the position of the presumed affected region is in a vector form that has a decreased size. The data that represents the position of the presumed affected region may be in a binary raster form.

At step S707, the imaging device 200 receives the metadata related to the size of the presumed affected region and the data that represents the position of the affected region from the image processing apparatus 300. At step S1301, the imaging device 200 generates the superimposed image. Specifically, at step S1301, the image-processing circuit 217 of the imaging device 200 generates the superimposed image as described with reference to FIG. 9B at step S744. The image data on which the information that represents the size and position of the presumed affected region is superimposed may be the image data that is transmitted from the imaging device 200 to the image processing apparatus 300 at step S406 or may be the latest image data that is used as the live view image for display. Subsequently, the imaging device 200 performs the process at step S709.

At step S716, the imaging device 200 receives the metadata related to the size of the presumed affected region and the data that represents the position of the affected region from the image processing apparatus 300. At step S1302, the imaging device 200 generates the superimposed image. Specifically, at step S1302, the image-processing circuit 217 of the imaging device 200 generates the superimposed image as described with reference to FIG. 9B at step S745. The image data on which the information that represents the size and position of the presumed affected region is superimposed is the image data that is transmitted from the imaging device 200 to the image processing apparatus 300 at step S715. Subsequently, the imaging device 200 performs a process at step S717.

According to the fourth embodiment, the data that is transmitted from the image processing apparatus 300 to the imaging device 200 can be reduced more than the third embodiment, and the communication traffic between the imaging device 200 and the image processing apparatus 300 can be reduced, and the communication speed can be increased.

Fifth Embodiment

Figure 14:
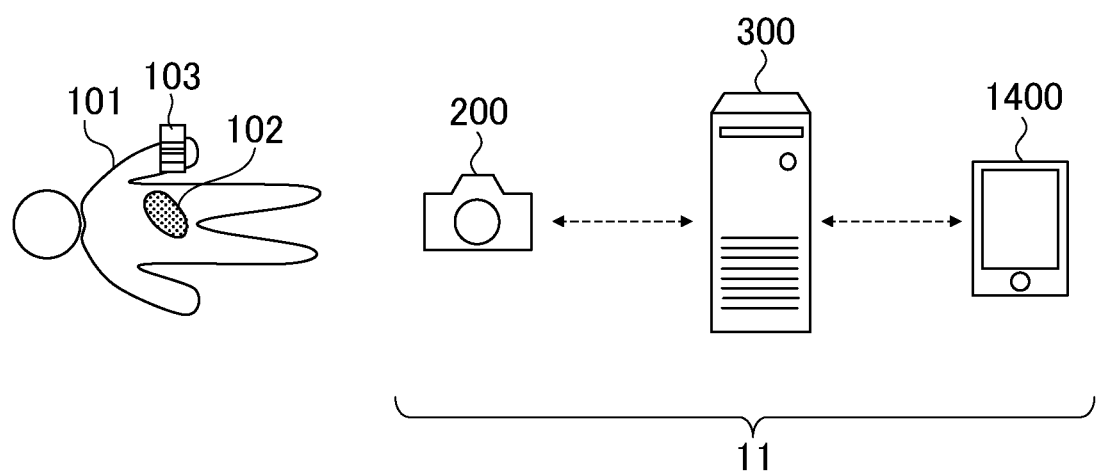
FIG. 14 schematically illustrates an affected-region-photographing apparatus according to a fifth embodiment.

FIG. 14 schematically illustrates an affected-region-photographing apparatus 11 according to a fifth embodiment. The affected-region-photographing apparatus 11 according to the fifth embodiment includes a terminal device 1400 that can access a Web in addition to the imaging device 200 and the image processing apparatus 300 that are the same as those according to the above embodiments. For example, the terminal device 1400 includes a tablet terminal, has a function of a Web browser, and can access a Web server and display a HTML file that is obtained. The terminal device 1400 is not limited to a tablet terminal provided that the terminal device 1400 can display a Web browser and may be, for example, a smartphone or a personal computer.

The CPU 310 of the image processing apparatus 300 performs a process of identifying the object from the image data in addition to the processes described according the third embodiment and the fourth embodiment. The CPU 310 performs a process of storing the information about the size and position of the presumed affected region and the image data of the affected region 102 that are associated with each other for every identified object in the storage device 312. The terminal device 1400 enables the information about the size of the presumed affected region and the image data of the affected region that are stored in the storage device 312 of the image processing apparatus 300 and that are associated with the object 101 to be seen with the Web browser.

The function of identifying the object from the image data, the function of storing the information about the affected region or the image data for every identified object, or the function of performing a Web service process is performed by the image processing apparatus 300 according to the present embodiment. However, this is not a limitation. At least one of these functions may be performed by another hardware other than the image processing apparatus 300.

According to the fifth embodiment, as illustrated in FIG. 14, a barcode tag 103 is attached to the object 101 as information for identifying the object, and the image data of the photographed affected region 102 and the ID of the object that is represented by the barcode tag 103 are associated with each other. The tag for identifying the object is not limited to a one-dimensional barcode tag and may be a two-dimensional code such as a QR code (registered trademark) or a numeral value. The tag for identifying the object may be a tag on which a text is written, and the image processing apparatus 300 may read the text of the tag by using its OCR (Optical Character Recognition/Reader) function.

The CPU 310 of the image processing apparatus 300 collates ID that is obtained by analyzing the barcode tag that is included in the data of the photographed image and the object ID that is registered in the storage device 312 in advance to obtain the name of the object 101. The imaging device 200 may analyze the ID and transmit the obtained ID to the image processing apparatus 300.

The CPU 310 generates a record based on the image data of the affected region 102, the information about the size of the affected region 102, the object ID, the obtained name of the object, time and data of photography, and so on and resisters these in a database of the storage device 312.

The CPU 310 transmits the information that is registered in the database of the storage device 312 in response to a request from the terminal device 1400.

Figure 15A:
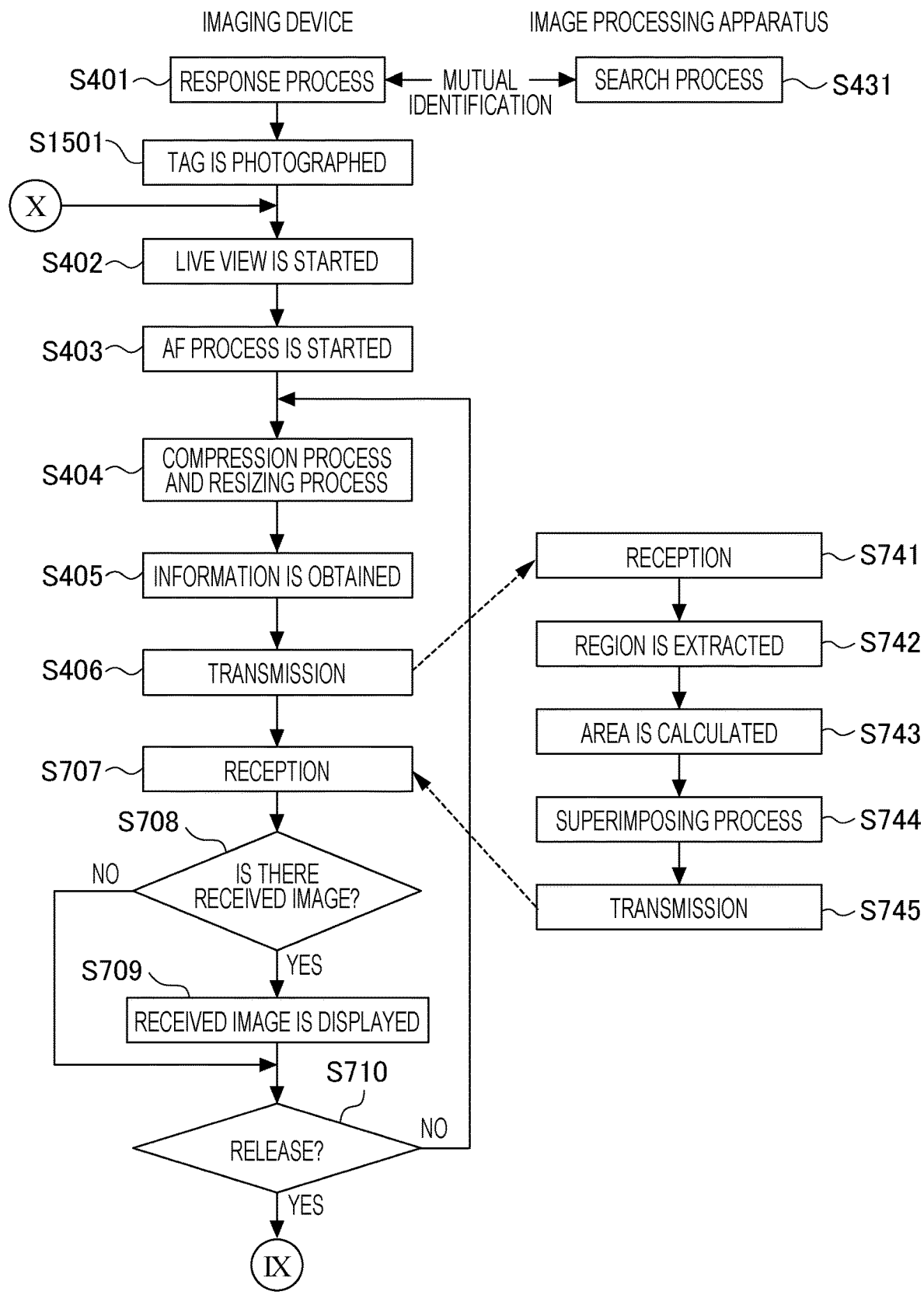

FIG. 15A and FIG. 15B illustrate a flowchart of operation of the affected-region-photographing apparatus 11 according to the fifth embodiment. In FIG. 15A and FIG. 15B, processes at steps on the left-hand side of the flow are performed by the imaging device 200, and processes at steps on the right-hand side of the flow are performed by the image processing apparatus 300. Among the steps illustrated in FIG. 15A and FIG. 15B, at steps that are designated by reference characters like to those in the steps illustrated in FIG. 7A and FIG. 7B, the same processes as those at the corresponding steps in FIG. 7A and FIG. 7B are performed.

At step S1501, the imaging device 200 that is connected to the image processing apparatus 300 at steps S401 and S431 causes the display device 223 to display, for example, a message for instructing the photographer such as the user to photograph the barcode tag 103. The imaging device 200 photographs the barcode tag 103 in response to the release operation of the user. After step S1501, the imaging device 200 performs the process at step S402.

The barcode tag 103 includes information about patient ID for identifying the patients as the object ID for identifying the object 101 described above. According to the fifth embodiment, the imaging device 200 photographs the barcode tag 103 and subsequently photographs the affected region 102. The affected-region-photographing apparatus 11 according to the fifth embodiment manages the order of photography by using, for example, the time and date of photography and identifies an image of the object that is located between the image of a barcode tag and the image of a next barcode tag by using the object ID. Naturally, the order may be such that the barcode tag 103 is photographed after the affected region 102 is photographed.

After the processes at steps S402 to step S715 are performed, the communication device 219 transmits one or more pieces of information including the image data and the distance information to the image processing apparatus 300 through wireless communication. According to the fifth embodiment, the image data that is transmitted at step S715 includes the image data of the photographed affected region 102 and the image data of the barcode tag 103 photographed at step S1501.

According to the fifth embodiment, after the processes at steps S751 to step S756 are performed as described above, the image processing apparatus 300 performs a process at step S1502.

At step S1502, the CPU 310 performs a process of reading the object ID (that is, the patient ID) for identifying the object 101 from the image data of the barcode tag that is included in the image data that is photographed at step S1501 by the imaging device 200.

At step S1503, the CPU 310 subsequently collates the read object ID and the ID of the object that is registered in the database of the storage device 312 in advance to obtain the name of the object.

At step S1504, the CPU 310 subsequently creates a record based on the image data of the photographed affected region 102, the information about the size of the affected region 102, the object ID, the obtained name of the object, the time and date of photography, and so on and registers these in the database of the storage device 312. At step S1505, the CPU 310 subsequently transmits the information that is registered in the database of the storage device 312 to the terminal device 1400 in response to a request from the terminal device 1400.

Figure 16:
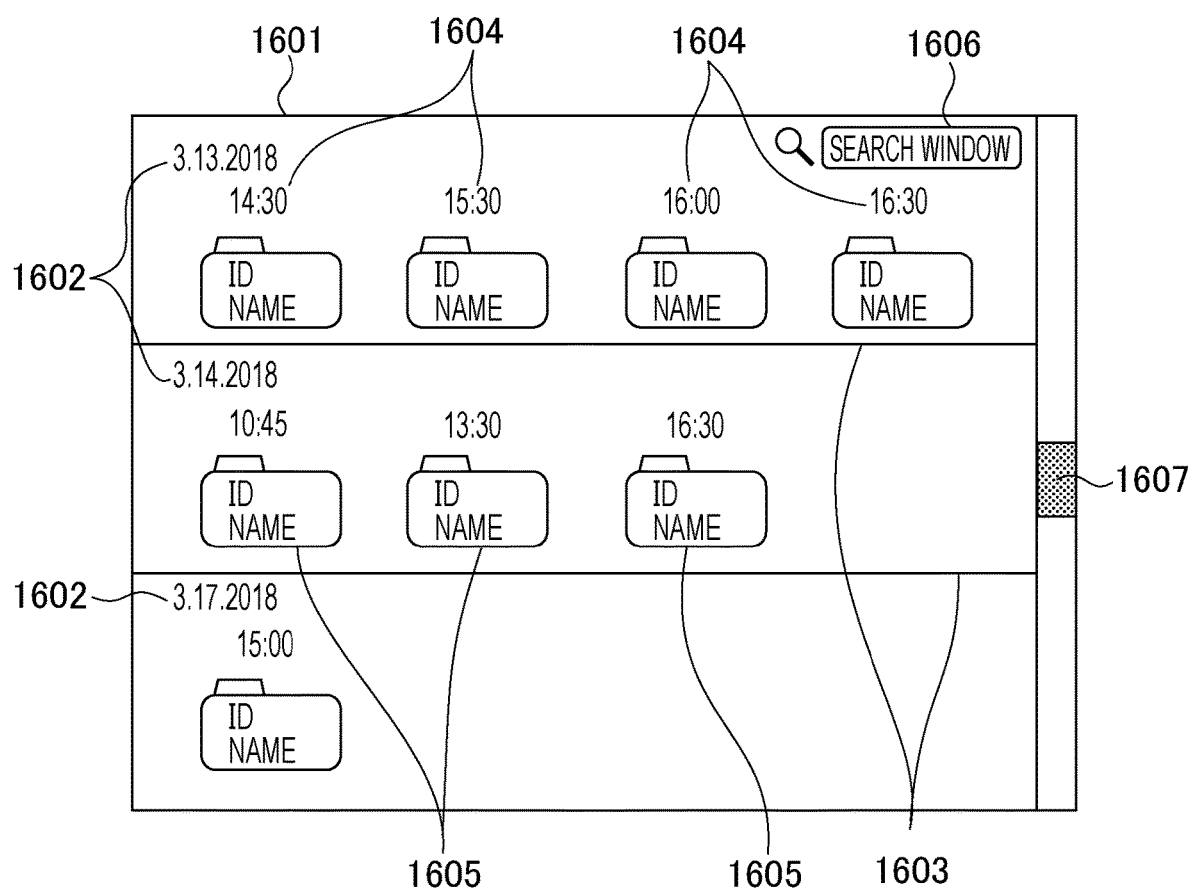
FIG. 16 illustrates an example of a selection screen that is displayed on a terminal device.
Figure 17:
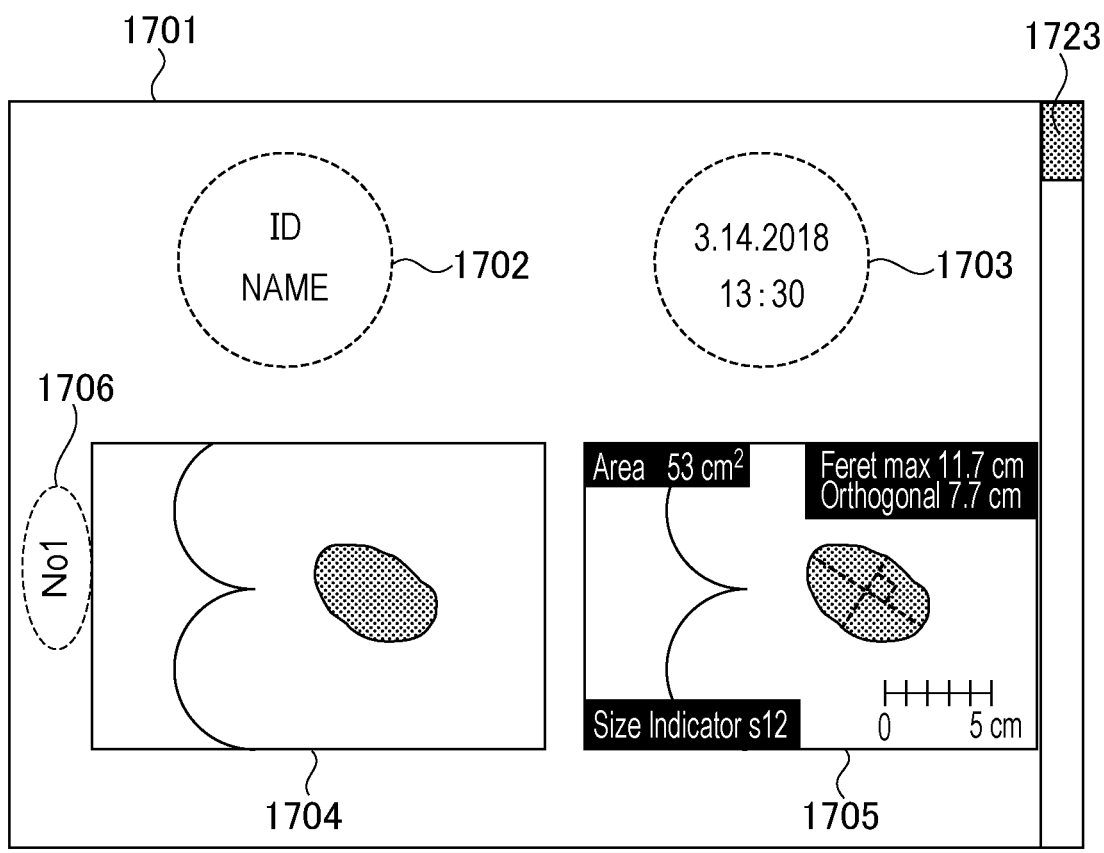
FIG. 17 illustrates an example of a list screen that is displayed on the terminal device.

FIG. 16 and FIG. 17 illustrate examples of display of the browser in the terminal device 1400. FIG. 16 illustrates an example of a data selection screen that is displayed on the terminal device 1400. The data selection screen 1601 is partitioned by partition lines 1603 for respective dates 1602. In date regions, icons 1605 are displayed for respective imaging times 1604. For the icons 1605, the object ID and the name of the object are displayed. Each of the icons 1605 represents a data set of the same object that is photographed in the same time zone. The data selection screen 1601 includes a search window 1606. In the case where the user, for example, inputs the date, the object ID, or the name of the object in the search window 1606, the terminal device 1400 searches the data set on the basis of inputted information. In the case where the user, for example, operates a scroll bar 1607, the terminal device 1400 displays enlarged pieces of data in a restricted display region in response to the operation. When the user, for example, selects and clicks any one of the icons 1605, the terminal device 1400 displays a data view screen of the browser and allows the user to view the image of the data set and the information about the size of the object. The terminal device 1400 transmits a request that represents the object, the time, and the date that are designated by, for example, the user to the image processing apparatus 300. The image processing apparatus 300 transmits the image data and the information about the size of the object to the terminal device 1400 in response to the request from the terminal device 1400.

FIG. 17 illustrates an example of a data list screen that is displayed on the browser of the terminal device 1400. The object ID of the data set that is selected on the data selection screen 1601 in FIG. 16, the name 1702 of the object, the time and date 1703 of photography are displayed on a data view screen 1701. An image 1704 based on the image data at one photography and data 1705 including the information about the size and position of the affected region in the image 1704 are also displayed on the data view screen 1701. A photography number 1706 in the case where the affected region of the same object is continuously photographed multiple times is also displayed on the data view screen 1701.

With these structures, the affected-region-photographing apparatus 11 according to the fifth embodiment can identify and store the image data of the affected region 102 and the result of analysis thereof for every object in addition to the effects of the affected-region-photographing apparatus 1 according to the third embodiment. The user can see the result of analysis of the image data of the affected region 102 in association with the object ID and the name of the object by using the Web browser of the terminal device 1400 such as a tablet terminal.

Other Embodiments

In the examples according to the above embodiments, the injury region of, for example, the pressure ulcer that occurs in the surface layer of the skin on the body surface of a human being or an animal is imaged. However, the imaging device may be, for example, an endoscope camera, and the object that is imaged by the endoscope camera may be an injury region in a surface layer of, for example, a stomach wall. Other than these, the methods described according to the above embodiments can be used in the case where a damaged region such as peeling in a surface layer of a wall surface of a building is identified as the specific region.

The aspect of the embodiments can also be carried out in a manner in which a system or the device is provided with a program for performing one or more functions according to the above embodiments via a network or a storage medium, and one or more processors of a computer of the system or the device read and execute the program. The aspect of the embodiments can also be carried out by a circuit (for example, an ASIC) for performing one or more functions.

The above embodiments are specifically described by way of example to carry out the aspect of the embodiments. The technical scope of the disclosure is not interpreted in a limited range because of the above embodiments. That is, the disclosure can be carried out as various embodiments without departing from the technical concept or the principal features.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-060349 filed Mar. 27, 2019, which is hereby incorporated by reference herein in its entirety.

What is claimed is:

1. An apparatus comprising:
at least one processor configured to perform operations as:
a generation unit that identifies at least an outer edge of a specific region in a surface layer of an object from an image of the object and that generates outer edge candidates; and
a control unit that selects an outer edge candidate based on an instruction from a user among the generated outer edge candidates,
wherein the generation unit identifies the specific region and generates the outer edge candidates regarding the image of the object imaged based on a position that is designated by the user, and
wherein the control unit selects the outer edge candidate based on the designated position among the generated outer edge candidates.

2. The apparatus according to claim 1,
wherein the control unit saves, in a storage medium, information about a shape of the selected outer edge candidate and an image of the specific region depending on the selected outer edge candidate.

3. The apparatus according to of claim 1,
wherein the generation unit identifies status regions included in the specific region and generates the outer edge candidates for the respective status regions, and
wherein the control unit causes a display device to display an image that is obtained by superimposing the outer edge candidates for the respective status regions on an image of the specific region, and selects an outer edge candidate based on the instruction from the user from the obtained image.

4. The apparatus according to claim 3,
wherein the control unit causes the display device to display an image that is obtained by superimposing at least one outer edge candidate among the outer edge candidates on the specific region.

5. The apparatus according to claim 4,
wherein the control unit causes the display device to display an image that is obtained by superimposing an outer edge candidate corresponding to at least one status region among the outer edge candidates for the respective status regions on the specific region.

6. The apparatus according to claim 1,
wherein the generation unit identifies the specific region from a region in which a feature that is same as or approximates to a feature of an image at the designated position is continuous.

7. The apparatus according to claim 1,
wherein the generation unit excludes, from candidate regions to be identified as the specific region, a candidate region having a feature that differs from a feature of an image at the designated position among candidate regions that are presumed to correspond to the specific region based on the designated position.

8. The apparatus according to claim 7,
wherein the generation unit identifies, as the specific region, a candidate region having highest reliability of a degree of certainty that the candidate region corresponds to the specific region among remaining candidate regions other than the excluded candidate region.

9. The apparatus according to claim 1, wherein the generation unit selects a candidate region having a feature that differs from a feature of an image at the designated position among candidate regions that are presumed to correspond to the specific region based on the designated position and reduces reliability of a degree of certainty that the candidate region corresponds to the specific region.

10. The apparatus according to claim 1, wherein the control unit causes a display device to display a preview image in which the outer edge candidates are superimposed on the specific region, and wherein the generation unit identifies the specific region and generates the outer edge candidates regarding a still image that is obtained while the preview image is displayed.

11. The apparatus according to claim 1, wherein the control unit obtains information for use in evaluation of the specific region based on information about an external shape of the selected outer edge candidate.

12. The apparatus according to claim 11, wherein the specific region is an injury region in the surface layer of the object, and wherein the control unit obtains information for use in evaluation of a size of an external shape of the injury region.

13. The apparatus according to claim 12, wherein the injury region is an affected region of an injury that occurs in a surface layer of a skin.

14. An apparatus comprising:
at least one processor configured to perform operations as:
a generation unit that identifies at least an outer edge of a specific region in a surface layer of an object from an image of the object and that generates outer edge candidates; and
a control unit that selects an outer edge candidate based on an instruction from a user among the generated outer edge candidates,
wherein the generation unit identifies the specific region and generates the outer edge candidates regarding the image of the object based on a region that is designated by the user, and
wherein the control unit selects the outer edge candidate based on the designated region among the generated outer edge candidates.

15. The apparatus according to claim 14, wherein the generation unit identifies the specific region based on a region that is designated by defining a closed curve by the user.

16. The apparatus according to claim 15, wherein the generation unit identifies the specific region based on a size of a portion that overlaps the region in which the user defines the closed curve.

17. The apparatus according to claim 15, wherein the generation unit excludes, from candidate regions to be identified as the specific region, a candidate region having a portion that overlaps the region in which the user defines the closed curve and that has a size smaller than a threshold among candidate regions that are presumed to correspond to the specific region based on the region in which the user defines the closed curve.

18. The apparatus according to claim 17, wherein the generation unit identifies, as the specific region, a candidate region having a portion that overlaps the region in which the user defines the closed curve and that has a maximum size among remaining candidate regions other than the excluded candidate region.

19. The apparatus according to claim 15, wherein the generation unit reduces reliability of a degree of certainty that candidate regions that are presumed to correspond to the specific region based on the region in which the user defines the closed curve correspond to the specific region, and an amount of the reduction increases as a size of a portion that overlaps the defined region decreases.

20. A method comprising:
generating outer edge candidates by identifying at least an outer edge of a specific region in a surface layer of an object from an image of the object; and
selecting an outer edge candidate based on an instruction from a user among the generated outer edge candidates,
wherein the identifying identifies the specific region and the generating generates the outer edge candidates regarding the image of the object based on a position that is designated by the user, and
wherein the selecting selects the outer edge candidate based on the designated position among the generated outer edge candidates.

21. A non-transitory computer-readable storage medium storing a program of instruction for causing a computer to perform a method comprising:
generating outer edge candidates by identifying at least an outer edge of a specific region in a surface layer of an object; and
selecting an outer edge candidate based on an instruction from a user among the generated outer edge candidates,
wherein the identifying identifies the specific region and the generating generates the outer edge candidates regarding the image of the object based on a region that is designated by the user, and
wherein the selecting selects the outer edge candidate based on the designated region among the generated outer edge candidates.

* * * * *